(12) United States Patent
Shirvanian et al.

(10) Patent No.: US 12,027,711 B2
(45) Date of Patent: Jul. 2, 2024

(54) THIN-FILM CATALYST WITH ENHANCED CATALYST-SUPPORT INTERACTIONS

(71) Applicant: UChicago Argonne, LLC, Chicago, IL (US)

(72) Inventors: Alizera Pezhman Shirvanian, Cookeville, TN (US); Deborah J. Myers, Lisle, IL (US); Jeffrey W. Elam, Elmhurst, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 16/155,725

(22) Filed: Oct. 9, 2018

(65) Prior Publication Data

US 2019/0109330 A1    Apr. 11, 2019

Related U.S. Application Data

(60) Provisional application No. 62/569,950, filed on Oct. 9, 2017.

(51) Int. Cl.
*H01M 4/92* (2006.01)
*B82Y 30/00* (2011.01)
*H01M 4/88* (2006.01)

(52) U.S. Cl.
CPC ........... *H01M 4/925* (2013.01); *B82Y 30/00* (2013.01); *H01M 4/8867* (2013.01); *H01M 2250/20* (2013.01)

(58) Field of Classification Search
CPC .......................... H01M 4/925; H01M 4/8867
See application file for complete search history.

(56) References Cited

U.S. PATENT DOCUMENTS

| | | | | |
|---|---|---|---|---|
| 2006/0188774 | A1* | 8/2006 | Niu | H01M 4/921 429/409 |
| 2006/0246344 | A1 | 11/2006 | Halalay et al. | |
| 2006/0257719 | A1* | 11/2006 | Merzougui | H01M 8/1007 429/492 |
| 2008/0058204 | A1* | 3/2008 | Lai | B01J 23/8946 502/330 |
| 2012/0003548 | A1* | 1/2012 | Shishikura | H01M 4/90 429/405 |
| 2015/0207153 | A1* | 7/2015 | Harkness | H01M 4/92 502/5 |
| 2017/0263944 | A1* | 9/2017 | Schladt | H01M 4/8605 |

OTHER PUBLICATIONS

Alia, et al., "Oxidation of Platinum Nickel Nanowires to Improve Durability of Oxygen-Reducing Electrocatalysts," Journal of The Electrochemical Society, 163(3), pp. F296-F301 (2016).

(Continued)

*Primary Examiner* — Jimmy Vo
(74) *Attorney, Agent, or Firm* — Foley & Lardner LLP

(57) ABSTRACT

An efficient, stable catalyst material having a thin film catalyst supported on a support of metal carbide, nitride, oxide, carbonitride, oxycarbonitride core. The thin film catalyst comprises a catalytic metal selected from the group consisting of platinum-group metals, platinum-group metal oxides, transition metals, transition metal oxides, and combinations thereof. The thin film catalyst is covalently bonded to the support.

12 Claims, 15 Drawing Sheets

Pt Catalyst nanoparticle supported on porous carbon (Pt-NP/C)

(56) References Cited

OTHER PUBLICATIONS

Alia, et al., "Platinum coated copper nanowires and platinum nanotubes as oxygen reduction electrocatalysts," ACS Catalysis 3(3), pp. 358-362 (2013).
Banham & Ye, "Current Status and Future Development of Catalyst Materials and Catalyst Layers for Proton Exchange Membrane Fuel Cells: An Industrial Perspective," ACS Energy Letters 2(3), pp. 629-638 (2017).
Bing, et al., "Nanostructured Pt-alloy electrocatalysts for PEM fuel cell oxygen reduction reaction," Chemical Society Reviews 39, pp. 2184-2202 (2010).
Bonakdarpour, et al., "Oxygen Reduction Activity of Magnetron-Sputtered Pt1-x Cox (0<x<0.5) Films," Journal of the Electrochemical Society 155(2), pp. B108-B118 (2008).
Castanheira, et al., "Carbon corrosion in proton-exchange membrane fuel cells: Effect of the carbon structure, the degradation protocol, and the gas atmosphere," ACS Catalysis 5(4), pp. 2184-2194 (2015).
Cheng, et al., "Atomic scale enhancement of metal-support interactions between Pt and ZrC for highly stable electrocatalysts," Energy & Environmental Science 8, pp. 1450-1455 (2015).
Cheng, et al., "Electrocatalysts by atomic layer deposition for fuel cell applications," Nano Energy 29, pp. 220-242 (2016).
Christensen, et al., "Nanoscale Structure and Morphology of Atomic Layer Deposition Platinum on SrTiO3 (001)," Chemistry of Materials 21(3) pp. 516-521 (2009).
Daio, et al., "Lattice Strain Mapping of Platinum Nanoparticles on Carbon and SnO2 Supports," Scientific Reports 5, 13126, 10 pages (2015).
Debe, "Electrocatalyst approaches and challenges for automotive fuel cells," Nature 486, pp. 43-51 (2012).
Debe, et al., "High voltage stability of nanostructured thin film catalysts for PEM fuel cells," Journal of Power Sources 161(2), pp. 1002-1011 (2006).
Gao, et al., "Preparation and characterization of Ti0.7Sn0.3O2 as catalyst support for oxygen reduction reaction," Journal of Energy Chemistry 23(3), pp. 331-337 (2014).
Garsany, et al., "Experimental Methods for Quantifying the Activity of Platinum Electrocatalysts for the Oxygen Reduction Reaction," Analytical Chemistry 82(15), pp. 6321-6328 (2010).
Gould, et al., "Enhanced dry reforming of methane on Ni and Ni-Pt catalysts synthesized by atomic layer deposition," Applied Catalysis A: General 492, pp. 107-116 (2015).
Ham & Lee, "Transition metal carbides and nitrides as electrode materials for low temperature fuel cells," Energies 2(4), pp. 873-899 (2009).
Ho, et al., "Nanostructured Ti0.7Mo0.3O2 Support Enhances Electron Transfer to Pt: High-Performance Catalyst for Oxygen Reduction Reaction," Journal of the American Chemical Society 133(30), pp. 11716-11724 (2011).
Huang, et al., "High-performance transition metal-doped Pt3Ni octahedra for oxygen reduction reaction," Science 348(6240), pp. 1230-1234 (2015).
Kimmel, et al., "Trends in Electrochemical Stability of Transition Metal Carbides and Their Potential Use As Supports for Low-Cost Electrocatalysts," ACS Catalysis 4(5), pp. 1558-1562 (2014).
Kitchin, et al., "Role of Strain and Ligand Effects in the Modification of the Electronic and Chemical Properties of Bimetallic Surfaces," Physical Review Letters 93, 156801, 4 pages (2004).

Kongkanand, "Highly-Accessible Catalysts for Durable High-Power Performance," Hydrogen & Fuel Cells Program, 31 pages (2017).
Kumar & Ramani, "Ta0.3Ti0.7O2 Electrocatalyst Supports Exhibit Exceptional Electrochemical Stability," Journal of the Electrochemical Society 160(11), pp. F1207-F1215 (2013).
Lewera, et al., "Metal-Support Interactions between Nanosized Pt and Metal Oxides (WO3 and TiO2) Studied Using X-ray Photoelectron Spectroscopy," The Journal of Physical Chemistry C 115(41), pp. 20153-20159 (2011).
Li, et al., "Progress in the Development of Oxygen Reduction Reaction Catalysts for Low-Temperature Fuel Cells," Annual Review of Chemical and Biomolecular Engineering 7, pp. 509-532 (2016).
Liu, et al., "Highly graphitic carbon black-supported platinum nanoparticle catalyst and its enhanced electrocatalytic activity for the oxygen reduction reaction in acidic medium," Electrochimica Acta 93, pp. 25-31 (2013).
Liu, et al., "Importance of Particle Size and Distribution in Achieving High-Activity, High-Stability Oxygen Reduction Catalysts," ACS Catalysis 5(3), pp. 1560-1567 (2015).
Luo & Alonso-Vante, "The Effect of Support on Advanced Pt-based Cathodes towards the Oxygen Reduction Reaction," Electrochimica Acta 179, pp. 108-118 (2015).
Ma, et al., "The effect of substrates at cathodes in low-temperature fuel cells," ChemElectroChem 1, pp. 37-46 (2014).
Mukerjee, et al., "Role of Structural and Electronic Properties of Pt and Pt Alloys on Electrocatalysis of Oxygen Reduction," Journal of the Electrochemical Society 142(5), pp. 1409-1422 (1995).
Nesselberger, et al., "The Particle Size Effect on the Oxygen Reduction Reaction Activity of Pt Catalysts: Influence of Electrolyte and Relation to Single Crystal Models," Journal of the American Chemical Society 133(43), pp. 17428-17433 (2011).
O'Neill, et al., "Catalyst design with atomic layer deposition," ACS Catalysis 5(3), pp. 1804-1825 (2015).
Shao, et al., "Novel catalyst support materials for PEM fuel cells: current status and future prospects," Journal of Materials Chemistry 19, pp. 46-59 (2009).
Shinozaki, et al., "Oxygen Reduction Reaction Measurements on Platinum Electrocatalysts Utilizing Rotating Disk Electrode Technique: II. Influence of Ink Formulation, Catalyst Layer Uniformity and Thickness," Journal of the Electro Chemical Society 162(12), pp. F1384-F1396 (2015).
Stevens, et al., "Characterization and PEMFC testing of Pt1-xMx (M=Ru, Mo,Co, Ta,Au,Sn) anode electrocatalyst composition spreads," Journal of the Electrochemical Society 154(6), pp. B566-B576 (2007).
Vogel, et al., "Probing metal substrate interaction of Pt nanoparticles: Structural XRD analysis and oxygen reduction reaction," Applied Catalysis A: General 337(1-2), pp. 167-173 (2010).
Wagner, et al., "Electrochemistry and the future of the automobile," The Journal of Physical Chemistry Letters 1(14), pp. 2204-2219 (2010).
Wang, et al., "Effect of carbon black support corrosion on the durability of Pt/C catalyst," Journal of Power Sources 171(2), pp. 331-339 (2007).
Wang, et al., "Synthesis of conductive rutile-phased Nb0.06Ti0.94O2 and its supported Pt electrocatalysts (Pt/Nb0.06Ti0.94O2) for the oxygen reduction reaction," Dalton Transactions 41, pp. 1187-1194 (2012).
Yano, et al., "High durability of Pt/graphitized carbon catalysts for polymer electrolyte fuel cells prepared by the nanocapsule method," Journal of Electroanalytical Chemistry 688, pp. 137-142 (2013).

* cited by examiner

Pt Catalyst nanoparticle supported on porous carbon (Pt-NP/C)

THIN-FILM CATALYST WITH ENHANCED CATALYST-SUPPORT INTERACTIONS

CROSS-REFERENCE TO RELATED APPLICATIONS

This application claims priority to and the benefit of U.S. Provisional Patent Application No. 62/569,950, filed on Oct. 9, 2017, the content of which is incorporated by reference herein in its entirety.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to thin film catalysts and methods of making the same, specifically with application to low temperature fuel cell, water electrolyzer, and unitized regenerative fuel cell applications.

BACKGROUND

The fuel cell ("FC") stack at the heart of the FC electric vehicle ("FCEV") constitutes a prohibitively large fraction of FCEV cost mainly due to the platinum group metals ("PGMs") used as catalysts. Therefore, cost and durability of the PGM catalysts are considered among the primary challenges to FCEV commercialization. The slow electrocatalysis of the oxygen reduction reaction ("ORR") and poor durability of support and catalyst loom as the central issues. Currently, the best ORR catalysts are based on Pt or Pt alloys, but after years of research, the performance remains inadequate, requiring far too much Pt to be economical and requiring a considerable overpotential, $\eta \sim 0.3V$ leading to substantial FC efficiency losses. In addition, current state-of-the-art ORR catalysts are supported on an amorphous high-surface-area carbon powder which is unstable under fuel cell operating conditions, especially during high potential transients encountered during unmitigated system start-up and shut-down. The Department of Energy ("DOE") 2020 technical targets for PGM loading and catalyst activity for FCEVs are 0.125 mg-PGM/cm$^2$ for both electrodes and an ORR mass activity ("MA") of 0.44 A/mg-PGM. The catalyst and catalyst support stability technical target is less than 40% loss in this activity after 30,000 cycles of an accelerated stress test. The best commercial Pt/C catalysts have a MA of 0.4 A/mg-Pt and >60% loss in activity with cycling. Several approaches have been tried to address the activity and durability issues, as detailed below.

Catalysis performance has been improved significantly by nanoscale designs, including alloying of Pt with such metals as Ni or Co to form alloy nanoparticles on the carbon support. Other promising reports include a Mo—Pt$_3$Ni/C catalyst claimed to exceed DOE targets. However, all of these suggested systems have problems with performance degradation attributed to platinum dissolution, transition metal leaching, and carbon corrosion.

The most commonly used electrocatalyst support is a high surface area, porous, conductive carbon black (e.g., Vulcan XC-72 or Ketjen). The carbon serves to support the metal nanoparticles in the desired dispersed manner, to maximize the catalytic surface for the fuel cell reactions. Carbon has become the state-of-the-art support due to its electrical conductivity (e.g., 2S/cm for Vulcan XC-72) and relatively good chemical stability in the fuel cell environment.

During extended operation, however, or load cycling, and unmitigated start-up/shut-down, the carbon is known to undergo electrochemical oxidation to surface oxide and $CO_2$, accompanied by catalyst (Pt or Pt-M) oxidation/dissolution. An ideal catalyst support material for PEMFC electrocatalysts should have high surface area, chemical and electrochemical stability, and electronic conductivity. Also, strong catalyst/support interaction and proton conductivity are desirable, as the former can improve catalyst dispersion, activity, and durability while the latter can enlarge the triple phase boundary (boundary where electrons, protons, and oxygen react) and thereby improve performance. Extensive efforts have been underway for many years to develop more durable catalyst support materials than carbon black. The alterative support materials being developed can be divided into two major groups, carbon-based and non-carbon based supports.

For the carbon-based materials, most work has been mainly focusing on the more stable carbon forms such as the graphitized carbon black or graphitic carbon powders and nanostructured carbons including carbon nanotubes ("CNTs") and nanofibers ("CNFs"). The significantly higher corrosion resistance of graphitized carbon and submicron graphite has been attributed to decreased defect sites in the graphitic carbon.

CNTs or CNFs are usually considered as the rolled graphene sheets with a co-axis and with less dangling bonds and defects than carbon black. In addition to their high graphitic nature, they have high electrical conductivity, high stability, and mechanical strength. Thus, CNTs and CNFs are often found to be better and more durable catalyst supports than carbon black during accelerate degradation test, but suffer from lack of a strong anchoring interaction with the catalyst particles.

No matter how stable a particular form of carbon, however, the corrosion resistance is not sufficient due to the thermodynamics of carbon oxidation, with the thermodynamic potential of the carbon oxidation reaction being 0.207V vs. the standard hydrogen electrode ("SHE"). This has led to considerable interest in finding non-carbon supports. In addition, carbon has a weak interaction with the supported precious metals, thus limiting its ability to modify the catalytic reactivity of the precious metals and also to prevent loss of catalyst surface area via dissolution and migration/coalescence mechanisms.

Many conducting and semiconducting oxides of metals (e.g., tungsten, zirconium, and titanium) have been investigated as they are highly oxidation-resistant and stable in the fuel cell environment. All of these oxides extended electrocatalyst life, with Nb-doped $TiO_2$ showing the greatest improvement. Some oxides also enhanced the catalyst activity, attributed to improved Pt utilization on the support, due to an enlarged TPB, owing to the intrinsic proton conductivity, or to the stronger interaction between the support and catalyst. Nanostructured oxide support showed further improvement in activity and/or durability. For example, $W_{18}O_{49}$ nanowire supports exhibited about 2 times the activity of Pt/C; further, Pt sputtered on $TiO_2$ nanotube arrays exhibited no change in activity after 10,000 cycles from 0.6V to 1.2V, although surface area decreased by 20%.

Some transition metal carbides, such as tungsten carbide (WC) and titanium carbide (TiC), and nitrides (e.g., titanium nitride (TiN)) have also been investigated. Mixing of WC with carbon black promoted the ORR activity of Pt/C, with additional enhancement when Pt was deposited on WC by in situ reduction, which was attributed to uniform distribution of the Pt nanoparticles and a synergistic effect between Pt and WC. Cyclic potential testing from 0.6V to 1.8V indicated that WC was oxidized to WO3, leading to Pt supported on WOx-coated WC. The use of TiC and TiN as support showed that TiN- or TiC-supported Pt, when mixed with carbon black, had better durability than Pt/C for potential cycling between 0 and 1.2V versus RHE in aqueous electrolyte.

Carbon support, as generally utilized in NP-based catalysts (e.g., Pt—NP/C), has a weak interaction with the catalyst nanoparticles and, as mentioned previously, undergoes corrosion through the carbon oxidation reaction ("COR"). This further weakens the Pt—NP-support bond, thus limiting the durability of the catalyst layer in PEMFC. As discussed above, the use of metal oxide, carbide, and nitride support materials which are stable under the highly oxidizing and corrosive PEMFC cathode conditions eliminates the support corrosion issue. In addition, metal oxide, carbides, and nitrides can enhance both chemical stability and ORR activity of Pt catalysts through modifying the electronic structure of Pt. An X-ray photoelectron ("XPS") study of Pt-NPs deposited on a $TiO_2$ catalyst support indicated a state of high internal strain, and ORR-favorable electronic modification of the Pt. XPS studies of changes in the electronic properties of Pt—NP/$TiO_2$/C indicated a shift in the binding energy ("BE") of Pt 4f, suggesting increased electron density on Pt and thus more favorable ORR. The BE shifts were associated with charge transfer from oxide to Pt atoms and change in the lattice parameter due to alloy formation. Sasaki and co-workers showed that distortions in the lattice structure of $SnO_2$ induced strain on Pt-NPs that was not observed for Pt—NP/C and hinted that lattice strain as observed could improve catalytic activity. Lattice strain is known to strongly affect electrochemical activity and the support-induced strain could potentially improve ORR activity in Pt/$SnO_2$. However, because of the lower electronic conductivity of metal oxides, bare metal oxides are found unsuitable for Pt—NP based catalysts.

Another group developed a robust conductive mixed oxide $Ti_{0.7}Mo_{0.3}O_2$ support using a simple hydrothermal method and demonstrated very high activity and durability for ORR compared to commercial Pt—NP/C and PtCo—NP/C. Through X-ray near-edge absorption spectroscopy ("XANES"), a direct measure of Pt d-band vacancies was obtained as Pt/C<PtCo/C<Pt/$Ti_{0.7}Mo_{0.3}O_2$. Increased d-band vacancy has been correlated in many studies with increased ORR activity. In fact, the Pt/$Ti_{0.7}Mo_{0.3}O_2$ catalyst showed about 7 and 2.6 times higher ORR current densities compared to commercial Pt/C and PtCo/C with the same Pt loading, consistent with the trend in d-band vacancies measured. Furthermore, the enhanced ORR stability of Pt/$Ti_{0.7}Mo_{0.3}O_2$ was attributed to strong metal-support interaction ("SMSI"), which results in tight chemical binding of Pt-NPs on oxide support, thus preventing migration and agglomeration. Other studies on Pt—NP/MOx supports (such as Sn, Nb, and Ta doped $TiO_2$, by the Gao, Zhang, and Ramani research groups, respectively) indicated that the dopants enhanced the electronic conductivity of $TiO_2$ and enhanced ORR activity and durability, ascribed to SMSI. However, all of these studies are based on Pt or PGM catalysts in the nanoparticle form ("Pt—NP") which possess high surface energy due to extreme curvature and thus have the tendency to agglomerate, dissolve, or otherwise degrade.

A thin film-based technology, namely the nanostructured thin film ("NSTF") catalyst, from the 3M company has been shown to have superior ORR activity and durability, almost matching the area-specific activity of extended (bulk) surfaces. In NSTF, a continuous thin film of Pt/Pt alloy is deposited over an array of an organic pigment (perylene red) whisker support. Efforts such as alloying with Ni, Co, and other elements have yielded promising results with the caveat that the less noble metal have been found to leach from the thin films in the acidic fuel cell environment. With only perylene red as the catalyst support, NSTF is not amenable to fine-tuning the SMSI through support material.

Researchers at NREL have been working on "extended, continuous Pt nanostructures," focusing on deposition of continuous Pt structures on Cu, Ni, and Co nanowires. While these extended structures have led to activity gains over Pt/C and catalysts, the less noble metal in the support is also subject to dissolution, which in turn can cause high current density performance and durability issues in the fuel cell environment.

These various prior approaches have failed to provide a catalyst and support with suitable ORR activity and durability for the PEMFC application.

In addition to the PEMFC application, a related pursuit has also failed to provide a suitable catalyst. The conversion of hydrogen to electricity holds potential as a means to store large amounts of energy at low cost. In particular, researchers and industry have sought a process and system where electrolysis is used to produce hydrogen as a first half of the process and then a fuel cell is used to convert that hydrogen back to electricity as needed. If the electrolyzer and fuel cell are separate devices, the system is termed a discrete reversible or regenerative fuel cell; the combination of the two processes in one device is termed a unitized reversible or regenerative fuel cell ("URFC"). In principle, a URFC should decrease catalyst, membrane, balance of cell and plant costs relative to a discrete system that requires twice the materials.

The major barriers to widespread implementation of URFCs are high cost, low efficiency, and limited lifetime. These shortcomings and also the high cost of low temperature polymer electrolyte membrane water electrolyzers primarily arise from issues with the catalysts and specifically the oxygen evolution reaction ("OER") catalyst. The traditional URFC cell design utilizes one side of the cell for the oxygen (positive) reactions, OER and ORR, and the other side for the hydrogen (negative) reactions, hydrogen evolution ("HER") and hydrogen oxidation ("HOR"). An alternative design is to combine OER and HOR functions on one electrode and ORR and HER functions on the other electrode. The most stable and active OER catalysts are unsupported $IrO_2$ particles. The most active HOR catalyst is a Pt/C catalyst. However, as discussed above for PEMFCs, carbon supports are unacceptable for OER catalysts due to the high OER potential (>1.3V).

SUMMARY

One embodiment relates to a catalyst material. The catalyst material includes a support comprising a material selected from metal carbides, nitrides, oxides and combination thereof. A thin film is covalently bonded to the support, the thin film having a thickness of 0.5 to 5.0 nm, the thin film comprising a catalytic metal selected from the group consisting of platinum-group metals, platinum-group metal oxides, transition metals, transition metal oxides, and combinations thereof.

Another embodiment relates to fuel cell. The fuel cells include a catalytic material comprising: a support comprising a material selected from metal carbides, nitrides, oxides and combination thereof; and a thin film covalently bonded to the support, the thin film having a thickness of 0.5 to 5.0 nm, the thin film comprising a catalytic metal selected from the group consisting of platinum-group metals, platinum-group metal oxides, transition metals, transition metal oxides, and combinations thereof. The thin film interacts with the support through Strong Metal Support Interactions.

Another embodiment relates to a method of making a catalyst material comprising providing a plurality of a nanoparticles comprising a support material selected from metal carbides, nitrides, oxides and combination thereof; and depositing on the plurality of nanoparticles a thin film covalently bonded to the support material, the thin film having a thickness of 0.5 to 5.0 nm, the thin film comprising a catalytic metal selected from the group consisting of platinum-group metals, platinum-group metal oxides, transition metals, transition metal oxides, and combinations thereof.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1A:
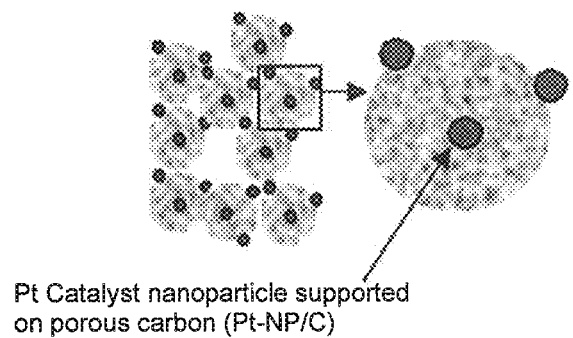
FIG. 1A shows conventional Pt—NP/C.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to a thin film catalyst with fine-tuned catalyst and support interactions for enhanced activity and durability (see FIG. 1 for schematic). A thin film of catalytic metal, typical a platinum group metal, on a metal carbide, nitride, and/or oxide support.

This invention relates to addressing both the stability and cost issues associated with the traditional unsupported $IrO_2$ OER catalyst by forming a conformal and thin coating of $IrO_2$, or another suitable electrocatalyst, on a high-surface-area, electronically-conductive, stable support using ALD. This invention also relates to forming a conformal and thin coating of a mixture of Pt and $IrO_2$, or other suitable electrocatalyst, on a high-surface-area, electronically-conductive, stable support using ALD for URFC OER/HER or OER/ORR electrodes.

Figure 1B:
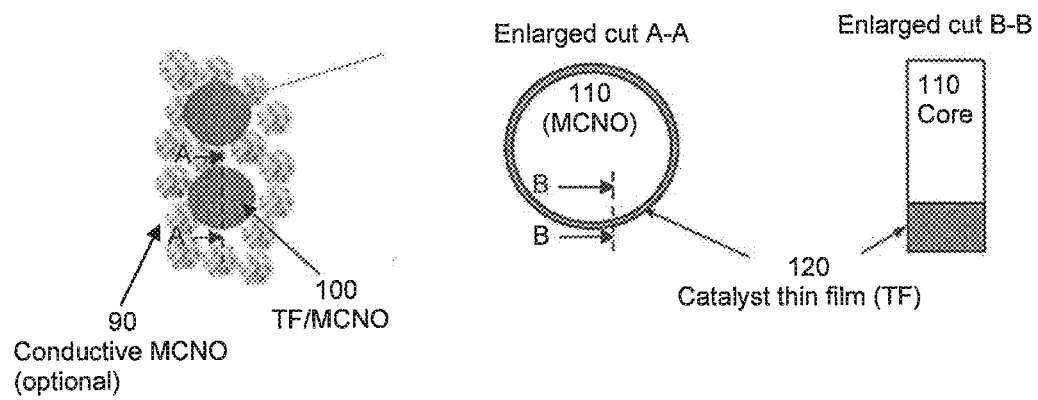
FIG. 1B shows TF/MCNO based on one embodiment.
Figure 2A:
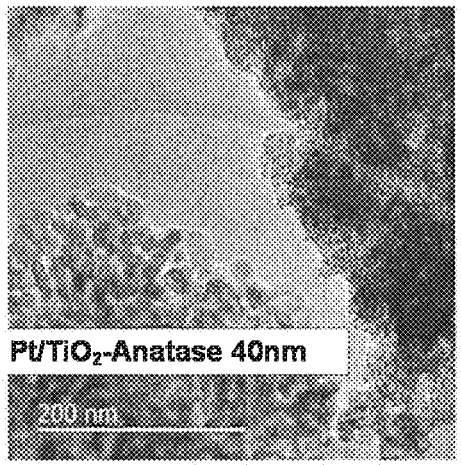
FIGS. 2A-2F illustrate micrographs of sample deposits. Samples of these atomic layer deposition ("ALD") thin film Pt deposited on MCNO powder supports were analyzed by ICP-MS to determine the concentrations of platinum. Measurements were made with a Perkin Elmer/SCIEX ELAN DRCII ICP-MS calibrated with standards prepared from NIST traceable solution procured from Ultra Scientific. Reported data were calculated from the ICP-MS concentration data, the volume of the prepared solution, and the mass of sample taken.
Figure 2B:
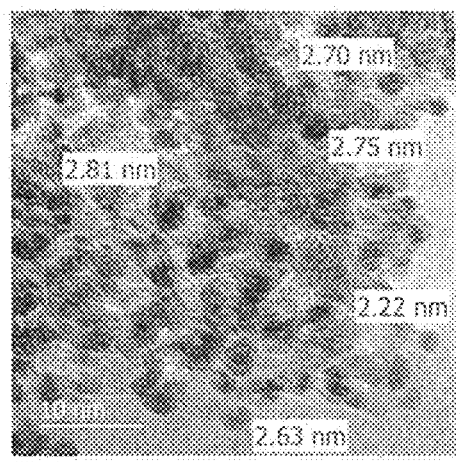
Figure 2C:
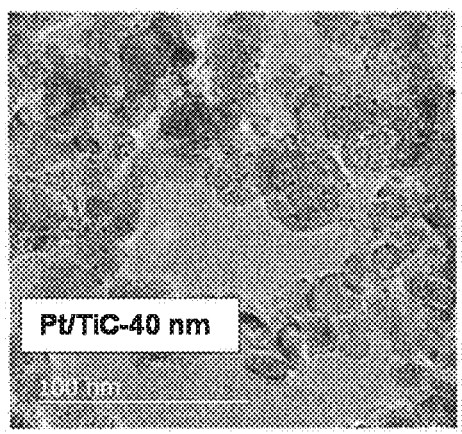
Figure 2D:
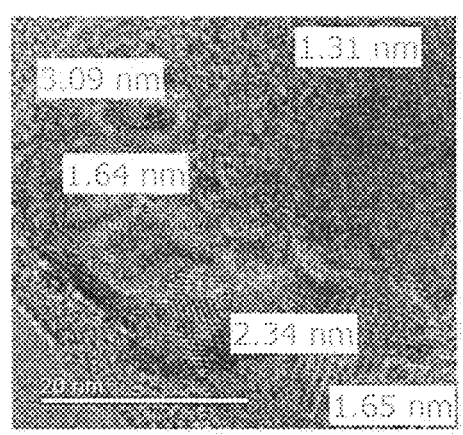
Figure 2E:
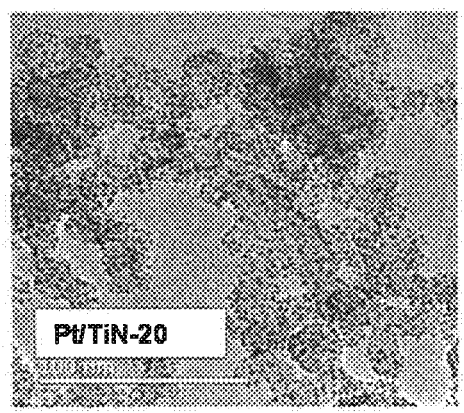
Figure 2F:
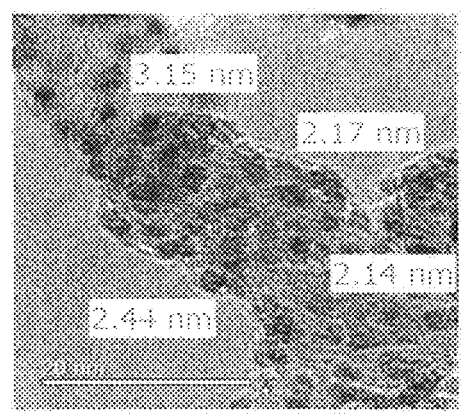
Figure 3:
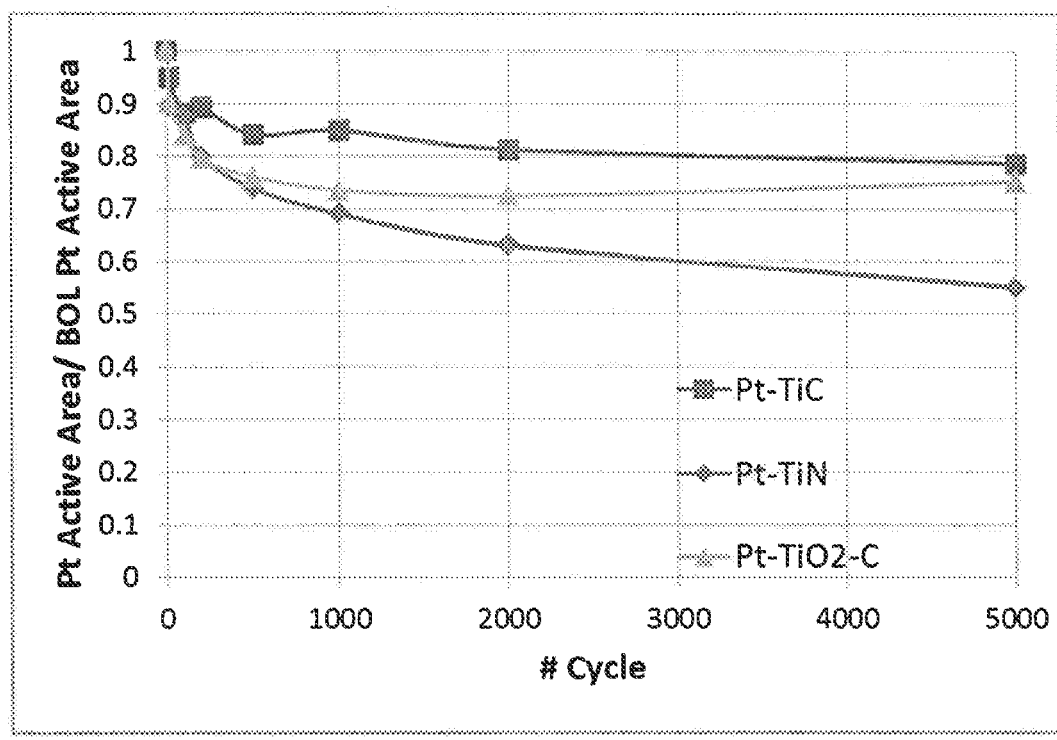
FIG. 3 shows that PtITiC is the best among the systems investigated followed closely by Pt—$TiO_2$—C and Pt—TiN in terms of loss of catalyst active surface area with an accelerated stress test of potential cycling between 1.0 and 1.5V at 500 mV/s.

One aspect relates to materials and apparatus having a thin film on a support material. Supports are metal carbide, metal nitride, and/or oxides (TF/$M_1M_2$ $C_xN_yO_z$) chosen to have strong interactions and favorable interactions with catalytic metal and stability in the catalytic environment. FIG. 1B shows views of the structure of one embodiment of a catalyst 100. A core material 110 comprises MCNO while a thin film 120 is bonded to the exterior surface of the core material 110. Additional conductive MCNO materials 90 may be provided to interact with the thin film coated catalyst material 100.

Another aspect relates to methods for forming the thin film on the support material. Specifically, in one embodiment, ALD is utilized to form thin, conformal films with strong interactions with the support materials.

Support Material

The catalyst support is chosen from metal carbide, nitride, oxide, carbonitride, oxycarbonitride and combination thereof. The nature of support material is such that it is stable in an electrochemical environment relevant to the HOR, ORR, and OER. While electrical conductivity in support is desirable, it is not required for TF/MCNO as the catalyst thin film can take on the function of conducting electrons in and out of active sites.

Titanium, Tantalum, and Zirconium Carbides (TIC, TaC, ZrC) are shown to be electrochemically stable for ORR and OER. Transition metal nitrides ("TMN") also show high corrosion resistance in electrochemical systems. In particular Titanium Nitride (TiN) has an enhanced onset corrosion potential of +3V vs. SHE over TiC with an onset potential of +2V vs. SHE. In contrast, the oxidation of carbon as used in conventional Pt—NP/C systems is thermodynamically possibly at an onset potential of +0.207 vs. SHE. Transition Metal Oxides ("$TMO_x$") are also highly stable in OER and ORR environment but suffer from low electrical conductivity. For this reason, doping with other transition metal oxides is favored to induce electrical conductivity in these materials.

Overall, using a single metal mixed nitride, carbide, oxide ("MCNO") or multi-metal mixed nitride, carbide, oxide (such as $M_1x_1M_2x_2$ $C_yN_zO_w$, where M1 and M2 are metals and where one of y, z, and w are greater than 0, preferably more than one of y, z, and w are greater than 0) makes for not only a durable catalyst support but generates a plethora of prospects to fine-tune selectivity and catalytic activity for the reaction under consideration through SMSI. It is postulated that these reactions are not limited to ORR and OER.

Thin Film Catalyst Deposition

A preferred method to deposit catalyst thin film on the MCNO is to use ALD. ALD is unique in its ability to create ultra-thin films of metals (e.g., Pt, Ir, Ru) or other materials, such as transition metal oxides (e.g., $TiO_2$, $ZrO_2$), transition metal nitrides (e.g., TiN, TaN, WN), and chalcogenides (e.g. $MoS_2$, $Al_2S_3$, $Cu_2S$) on powdered substrates to make catalytic objects based on TF/MCNO.

Physical vapor deposition techniques, including sputtering and electron beam deposition, are not suited to particle coatings as they are line-of-sight dependent. Chemical vapor deposition techniques are not self-limiting and therefore result in much thicker films (hundreds of nanometers).

Wet chemical techniques have clearly been developed for the deposition of platinum by the catalyst industry, but require significant energy input to remove the liquid phase after deposition. Also, unlike ALD films, which are covalently bonded to the surface, wet impregnation results in physisorption of the metal to the surface. This weak bonding causes the resulting catalyst structure to be in the form of nanoparticles and/or islands. These weakly bonded particles and islands can migrate and sinter, reducing the dispersion and effective surface area of the platinum. ALD Pt films have been shown to be more stable with time and temperature cycling because of the covalent bonding and also more catalytically active than Pt deposited by incipient wetness techniques. ALD utilizes a series of alternating surface reactions to deposit a film one atomic layer at a time. The key is that only one precursor is present in the reactor at a time, and that the precursor cannot react with itself. The result is self-limiting deposition with atomic layer control of a film that is covalently bonded to the surface. ALD is also line-of-sight independent. It will deposit anywhere that the precursors can diffuse in the gas phase.

In one embodiment, a catalyst material is provided in the form of a catalyst thin film on catalyst support. Catalyst material is chosen from PGM or PGM oxide, transition metal, transition metal oxide, or any combination thereof. For instance, the PGM may be Pt, Ir, Ru, Re, Os, Pt, or Rh, or any combination of these metals or the corresponding oxides. The transition metal may be V, Cr, Mn, Fe, Co, Ni, Cu, Nb, Mo, Ta, or W, or any combination of these metals or their oxides. Catalyst support material is chosen from transition metal carbides, nitrides, oxides and combination thereof. Catalyst support material does not contain carbon in its elemental form. Catalyst support material has dimensions larger than 10 nm in effective diameter but smaller than 500 nm. A preferred size is in the range of 40-60 nm. Thin films of Pt/PGM catalyst can either totally encapsulate the support or can cover the support in patches of thin films. Patches of thin films on catalyst support are preferably >10 nm in diameter and between 0.5 to 5 nm in thickness. Thin film catalyst interacts with the support through SMSI which includes electron transfer to/from support as well as lattice compression/expansion. SMSI enables catalytic activity and selectivity to be fine-tuned for the desired reaction. SMSI can be adjusted through a combination of catalyst support size, chemical composition, and phase. Ozone can be used as the co-reactant for the ALD of the catalyst material when the desired material is a metal oxide, or a noble metal. In certain cases, ozone is more effective compared to oxygen and facilitates faster reactions and lower deposition temperatures.

In one embodiment, as noted above, the thin film is deposited by ALD. The ALD process may include exposing the substrate to a first metal precursor for a first predetermined time and a first partial pressure of the first metal precursor so that the metal precursor deposits on, coats, or infiltrates at least a portion of the base material and binds with the base material. The metal precursor may be any suitable beta-diketonate, chloride, fluoride, iodide, alkyl amide, cylopentadiene, substituted cylopentadiene, alkoxy, amidinate, guanidinate, carbonyl, or heteroleptic compound of the metals listed in [0042]. For example, the metal precursor may be Palladium (II) hexafluoroacetylacetonate, Copper bis(2,2,6,6-tetramethyl-3,5-heptanedionate), Copper (II) hexafluoroacetylacetonate hydrate, Nickel bis(2,2,6,6-tetramethyl-3,5-heptanedionate), Iron tris(2,2,6,6-tetramethyl-3,5-heptanedionate), Manganese tris(2,2,6,6-tetramethyl-3,5-heptanedionate), Molybdenum dioxide bis(2,2,6,6-tetramethyl-3,5-heptanedionate), Cobalt tris(2,2,6,6-tetramethyl-3,5-heptanedionate), Copper (II) acetylacetonate, Nickel (II) acetylacetonate, MoO2 bis-acetylacetonate, Rhodium (III) acetylacetonate, Iridium(III) acetylacetonate, Niobium pentachloride, Niobium (V) iodide, Vanadium (V) Oxytriisopropoxide, Niobium pentaethoxide, Tantalum (V) ethoxide, Iron (III) ethoxide, Iron (III) tert-butoxide dimer, Bis(cyclopentadienyl) ruthenium, Bis(cyclopentadienyl) nickel, Bis(ethylcyclopentadienyl) nickel, Bis(cyclopentadienyl) cobalt, (Trimethyl) methylcyclopentadienyl platinum (IV), 2,4-(dimethylpentadienyl)(ethylcyclopentadienyl) ruthenium, Bis(ethylcyclopentadienyl) ruthenium (II), Ferrocene, Cyclohexadiene iron tricarbonyl, Bis(ethylcyclopentadienyl) manganese, Tungsten hexafluoride, Tantalum (V) fluoride, Molybdenum hexafluoride, Niobium pentafluoride, Bis(N,N'-diisopropylacetamidinato)copper(I), Bis(N,N'-di-sec-butylacetamidinato)dicopper(I), AccuDEP Cobalt (Et)/Cobalt amidinate, or AccuDEP Iron/iron amidinate.

The background pressures used during the ALD, that is to say the pressure when no precursor is being dosed, can be in the range of 1e-10 Torr to 1000 Torr (e.g. 1e-10, 1e-8, 1e-6, 1e-4, 1e-3, 0.01, 0.1, 1, 10, 100, or 1000 Torr, inclusive of all ranges and values between). The first predetermined time can be in the range of 0.1 second to 500 seconds (e.g., 0.1, 0.5, 1, 5, 10, 20, 30, 40, 50, 60, 70, 80, 90, 100, 120, 140, 160, 180, 200, 220, 240, 260, 280, 300, 350, 400, 450 or 500 seconds, inclusive of all ranges and values between). In some embodiments, the first predetermined time is in the range of 0.1 and 10 seconds, for example about 5 seconds. The first partial pressure of the first metal precursor can be in the range of 0.01 Torr to 10 Torr. (e.g., 0.01, 0.05, 0.1, 0.5, 1.0, 5.0, 10 Torr, inclusive of all ranges and values therebetween). The ALD on the powder can be performed using a fixed powder bed, a fluidized bed where the fluidization is performed using gas flow, mechanical vibration, or a combination of the two, a rotating drum, or a moving bed. In addition to the temporal ALD described above, the coating may be performed using spatial ALD. The spatial ALD may be implemented using a moving bed, a rotating platform, or a roll-to-roll system if the powder is attached to a moving web using a binder.

In some embodiments, the ALD reactor and/or substrate material can be heated to a predetermined temperature during the ALD process. For example, the first predetermined temperature can be in the range of 25-450° C. (e.g., 25, 30, 40, 50, 60, 70, 80, 90, 100, 110, 120, 130, 140, 150, 160, 170, 180, 190, 200, 250, 300, 300, 350, 400, or 450° C., inclusive of all ranges and values therebetween).

In some embodiments, the second ALD coreactant is oxygen, hydrogen, hydrogen peroxide, ozone, ammonia, hydrazine, alkyl-substituted hydrazine, trimethyl-aluminum, or any mixtures thereof. In other embodiments, the ALD coreactant can be a plasma containing any of the aforementioned chemicals, or mixtures thereof, and also containing one or more noble gases.

Any number of cycles of exposing the coating to the first metal precursor and the second co-reactant precursor can be performed to reach a desired film thickness and density of bindings sites on the substrate. Between the precursor exposures the ALD reactor may be evacuated or purged with inert gas for a fixed time to remove or sweep away any unreacted precursor of gaseous reaction product. The purge times may be in the range of 0.1 second to 500 seconds (e.g., 0.1, 0.5, 1, 5, 10, 20, 30, 40, 50, 60, 70, 80, 90, 100, 120, 140, 160, 180, 200, 220, 240, 260, 280, 300, 350, 400, 450 or 500 seconds, inclusive of all ranges and values between).

Catalyst materials according to embodiments described herein decrease, relative to those methods described in the Background, the loading of expensive PGMs. The activity of the catalyst is increased by supporting the catalyst on a support material that modifies the electronic structure. The durability of the catalyst material is increased in comparison to bare catalysts, by the use of a support material that is stable in the catalytic environment. The catalyst has application in electrochemical devices, including, but not limited to, fuel cells, electrolyzers, reversible or regenerative fuel cells (combination of fuel cell and electrolyzer in one device), Li-Air batteries, and flow batteries.

Embodiments described herein may be used in a wide a range of applications. In one application, the catalyst material is utilized in a polymer electrolyte fuel cell systems, such as for automotive, portable, and stationary power.

EXAMPLES

ALD-Pt Deposited Powders

The following powder materials were purchased from US Research Nanomaterials, Inc.:

TiO2-Anatase, 40 nm

TiO2-Anatse, 5 nm

TiC, 40 nm

TiN, 20 nm

A custom made ALD system at Argonne National Laboratory was used to deposit Pt on these materials according to the following protocol:

| | |
|---|---|
| Instrument | Built-in-house tube-type reactor |
| Precursor | Trimethyl(methylcyclopentadienyl)platinum(IV) |
| Counter reactants | Ultra-high purity $O_2$ |
| Duration of pulses | 60 s (precursor pulse) - 120 s (purge) - 60 s (counter reactant pulse) - 120 s (purge) |
| Number of cycles | 5 super cycles |
| Reactor temperature | 250° C. |
| Reactor base pressure | 0.35 Torr |

In order to investigate the catalytic activity and durability of these powders, an ex-situ rotating disk electrode ("RDE") has been used according to the published guidelines. The following protocol and ink compositions were used to make a thin film electrode suitable for RDE testing:

a. 1 mg-Pt/TiO$_2$-40 nm, 0.2 mg Ketjen black carbon, 2 ml deionized water ("DIW"), 0.5 ml isopropyl alcohol ("IPA"), 5 microliter 5 wt % Nafion® 1100EW b. 1 mg-Pt/TiC-5 nm, 0.2 mg Ketjen black carbon, 2 ml DIW, 0.5 ml IPA, 5 microliters 5 wt % Nafion® 1100EW c. 1 mg-Pt/TiC-40 nm, 1 ml DIW d. 1 mg-Pt/TiN-20 nm, 1 ml DIW FIGS. 2A-2F illustrate micrographs of sample deposits. Samples of these ALD-Pt deposited powders were analyzed by ICP-MS to determine the concentrations of platinum. Measurements were made with a Perkin Elmer/SCIEX ELAN DRCII ICP-MS calibrated with standards prepared from NIST traceable solution procured from Ultra Scientific. Reported data were calculated from the ICP-MS concentration data, the volume of the prepared solution, and the mass of sample taken. The results are shown in the following table:

| Sample No. | Pt wt % |
| --- | --- |
| 5 cycles_Pt on 40 nm TiO$_2$ | 17.7 |
| 5 cycles_Pt on 5 nm TiO$_2$ | 21.0 |
| 5 cycles_Pt on 40 nm TiC | 5.39 |
| 5 cycles_Pt on 20 nm TiN | 20.2 |

It should be noted, in the embodiments of this example, the inks for TiC and TiN catalyst inks do not contain any carbon black, ionomer (Nafion®) or IPA. The inks were sonicated for at least 20 min and then 10 microliter aliquots from each ink were disposed on a clean glassy carbon ("GC") surface (5 mm diameter). The drying process was started by spinning the inverted electrodes at 700 rpm to allow more uniform formation of thin film and once a relatively dry film was formed, the electrode was left to air-dry overnight. The Pt loading on RDE GC for inks a, b, c, and d were 3.6, 4.2, 1.8, and 6.8 micrograms/cm$^2$, respectively.

These values were too low for obtaining activity data as commonly practiced in the field where loadings in excess of 20 micro-grams/cm$^2$ are used. Nevertheless, ORR measurements were performed and polarization curves are presented in FIGS. 4A-4F. To assess the durability of these catalysts, start/stop accelerated stress tests recommended by the DOE have been adopted wherein the cathode is exposed to a potential cycling from 1 to 1.5V vs. RHE at 500 mV/s scan rate and ECA of the catalyst is measured as a function of cycle number. The FIGS. 4A-F shows that Pt/TiC is the best among the systems investigated followed closely by Pt—TiO$_2$—C and Pt—TiN. The ECA loss after 5000 cycles for Pt—TiC, Pt—TiN and Pt—TiO$_2$—C were 21.4%, 45% and 24%, respectively. Please note that once a true thin film is formed on the substrates/catalyst supports, the ECA loss is expected to mitigate even more as a smaller area of support materials will be exposed to the electrochemical environment. Nevertheless, with this low loading of Pt and with Pt in nanoparticle form, which exposed the support material to electrochemical environment, TiC and TiO$_2$ lost less than 40% of ECA and thereby tentatively pass DOE guidelines for durability, whereas state-of-the-art Pt/C catalyst shows surface area loss of >60%.

Figure 4A:
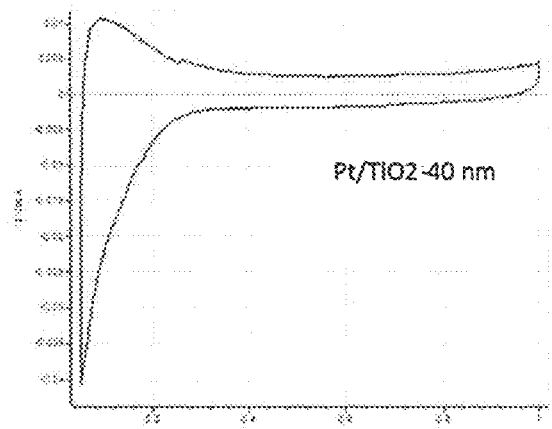
FIGS. 4A-F illustrate composite figures. The left column represents the cyclic voltammograms ("CVs") used to determine catalyst electrochemically-active surface area ("ECA") while the right column shows the cyclic voltammograms used to determine the ORR activity. The CVs and ORR curves prove the presence of Pt ECA and ORR activity.
Figure 4B:
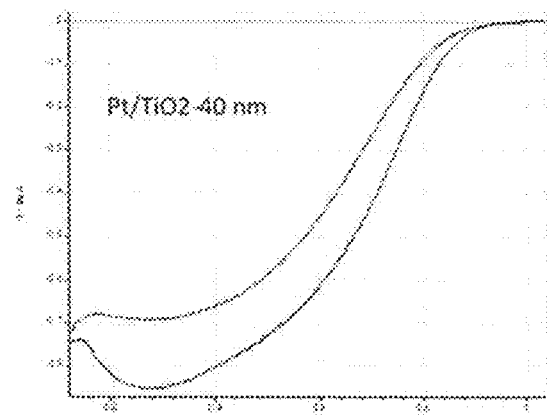
Figure 4C:
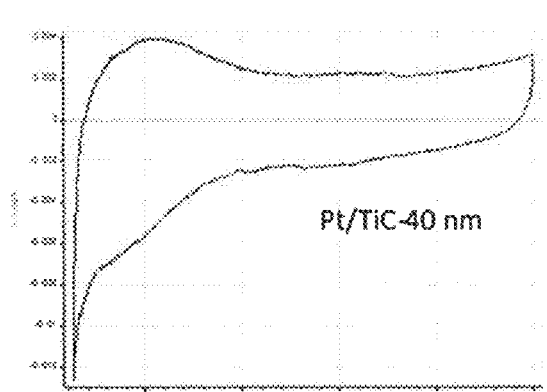
Figure 4D:
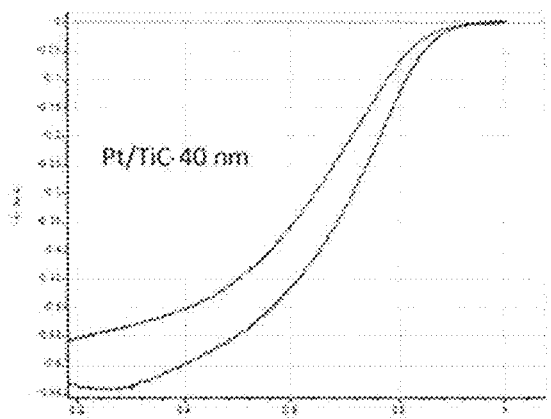
Figure 4E:
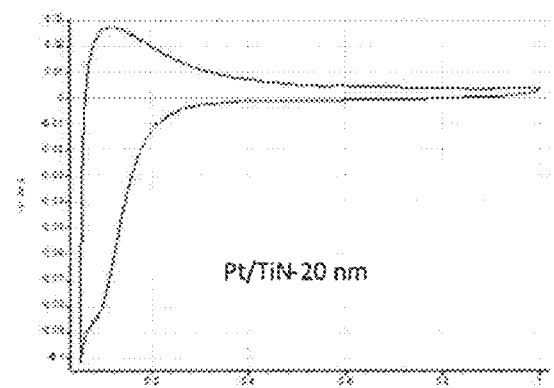
Figure 4F:
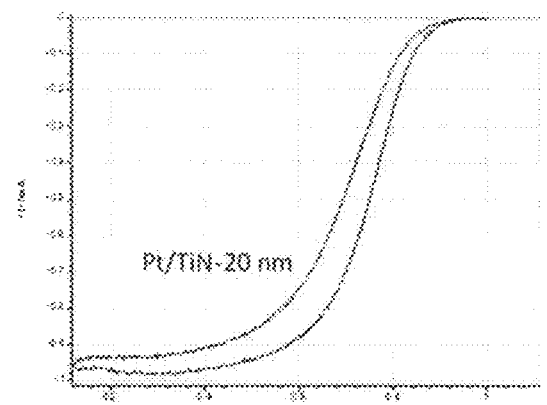

FIGS. 4A, 4C, and 4E represent the ECA voltammogram, while FIGS. 4B, 4D, and 4F show the ORR voltammogram. The ECA voltammogram proves that the Pt deposit is electrochemically active and thus that the support is electrically conductive, and the ORR voltammogram shows that the Pt deposit is catalytically active for the ORR.

Figure 5A:
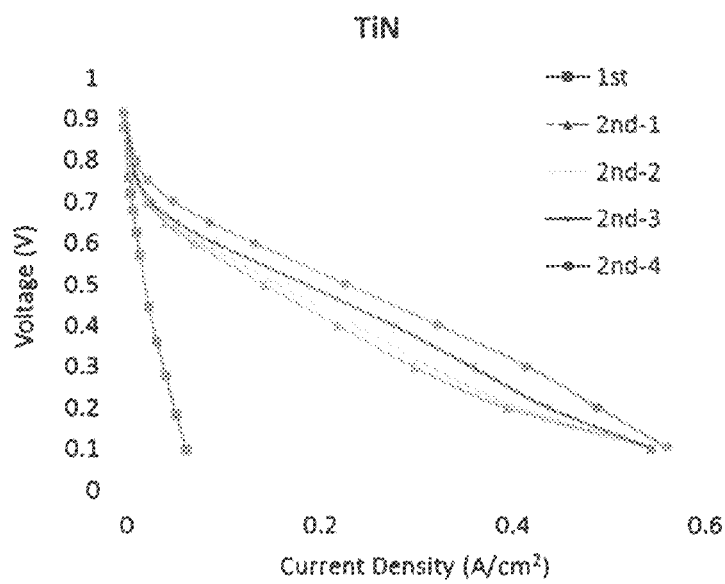
FIGS. 5A and 5B illustrate the current density results for the Pt/TiN and Pt/TiC powders, respectively.
Figure 5B:
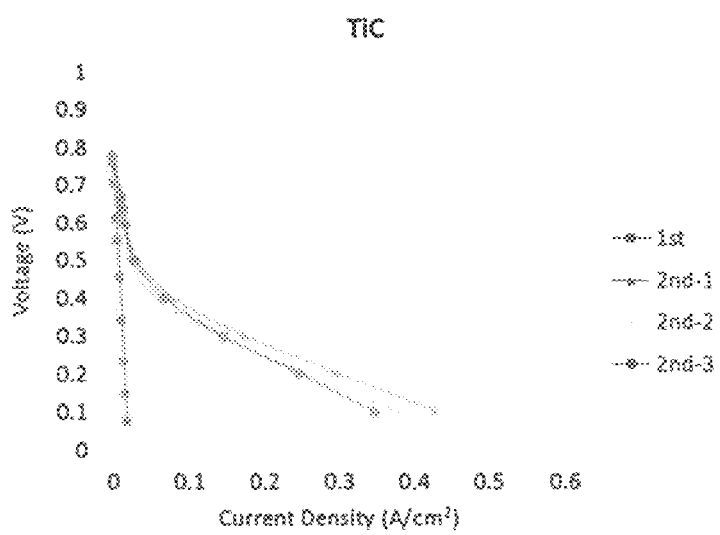

Pt/TiN and Pt/TiC powders were mixed with varying amounts of ionomer (proton-conducting polymer) and prepared into fuel cell membrane-electrode assemblies and their fuel cell performance tested:

Cathode: TiN or TiC onto 25BC GDL
Membrane: Nafion XL
Anode: 0.2 mg/cm$^2$ Pt loading, 29BD GDE
Cell: 5 cm$^2$ active area, 80° C., A/C: 15/15 psia, H$_2$/Air, 200/200 sccm, 100/100% RH FIGS. 5A and 5B illustrate the current density results for the Pt/TiN and Pt/TiC powders, respectively.

ALD-Pt Deposited Powders from Trimethyl(methylcyclopentadienyl)platinum(IV)

Platinum was deposited from a trimethyl(methylcyclopentadienyl)platinum(IV) precursor onto commercially-purchased titanium oxide particles of 40 nm diameter and on commercially-purchased titanium nitride of 20 nm diameter using ALD according to the process described above. The final loading of Pt on the supports was 28.6 wt % for TiO$_2$ and 20.2 wt % for TiN, as determined by ICP-MS. The HOR and OER activities of these materials were screened using the thin-film rotating-disk electrode technique and using 0.1M HClO$_4$ electrolyte. We therefore screened the HOR activity of these catalysts by saturating the electrolyte with hydrogen in an inert gas at a concentration below the flammability limit of hydrogen (3.618% hydrogen in helium). Various solvents were explored for the catalyst-ionomer inks to make a uniform and adherent deposit on the RDE's GC electrodes. Various loadings (110, 56, 38, and 19 µg-Pt/cm$^2$) of catalyst on the glassy carbon were also tested. The effect of RDE rotation on the HOR and OER results was also studied. The results reported here are those obtained using the optimum solvent, loading, and rotation rate found in these studies.

Figure 6:
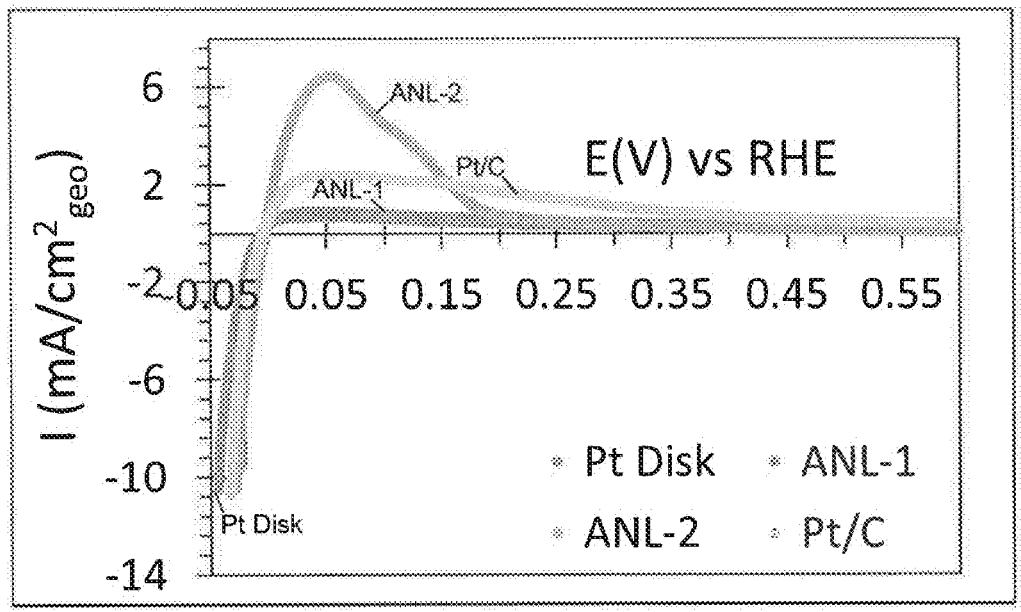
FIG. 6 is a graph of HOR voltammograms for the polycrystalline Pt RDE disk, Pt/$TiO_2$ (ANL-1), Pt/TiN (ANL-2), and a commercial 46 wt % Pt on a high surface area carbon ("Pt/HSC") from Tanaka.
Figure 7:
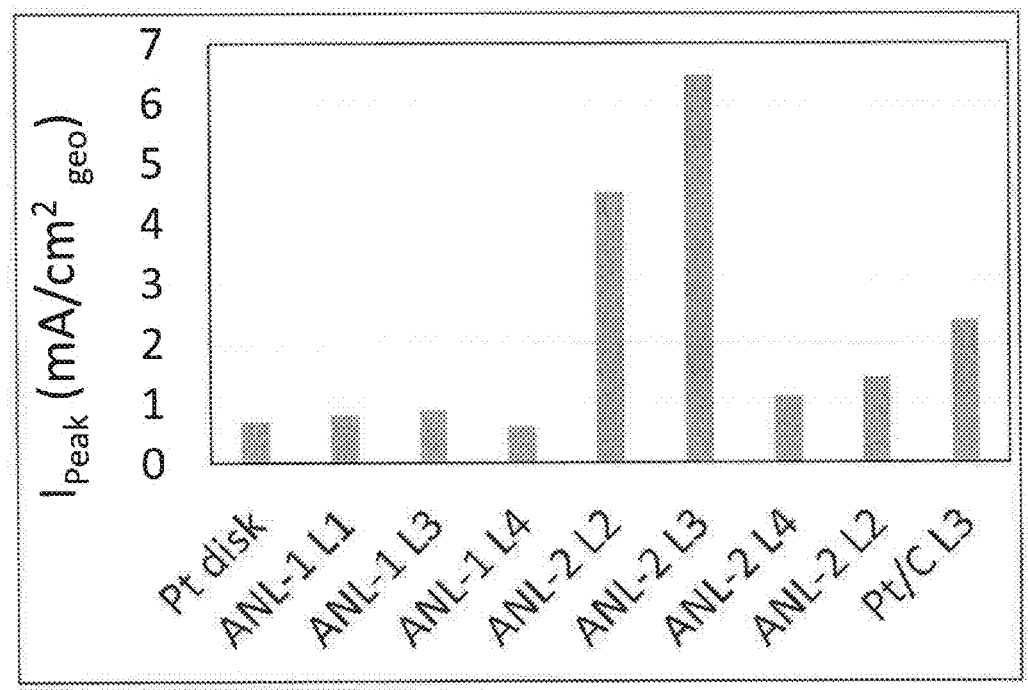
FIG. 7 is a bar graph of HOR peak current for the Pt RDE disk and for Pt/$TiO_2$ (ANL-1), Pt/TiN (ANL-2), and Pt/HSC at different loadings. L1=110 µg-Pt/$cm^2$, L2=56 µg-Pt/$cm^2$, L3=38 µg-Pt/$cm^2$, and L4=19 µg-Pt/$cm^2$.

The HOR voltammograms for a polycrystalline Pt disk, a commercial Pt/high-surface-area-carbon (TKK 46 wt % Pt/C), and for the Pt/TiO$_2$ and Pt/TiN catalysts are shown in FIG. 6. The relative HOR activity of these materials, reported in FIG. 7, is the peak current achieved in the anodic-going scan from 50 mV to 600 mV after a cathodic-going scan to 50 mV during which hydrogen is evolved. The results of FIGS. 5A and 5B show that the HOR activity of Pt/TiN catalyst is over three times that of Pt/C at a loading of 36-39 µg-Pt/cm$^2$.

Figure 8:
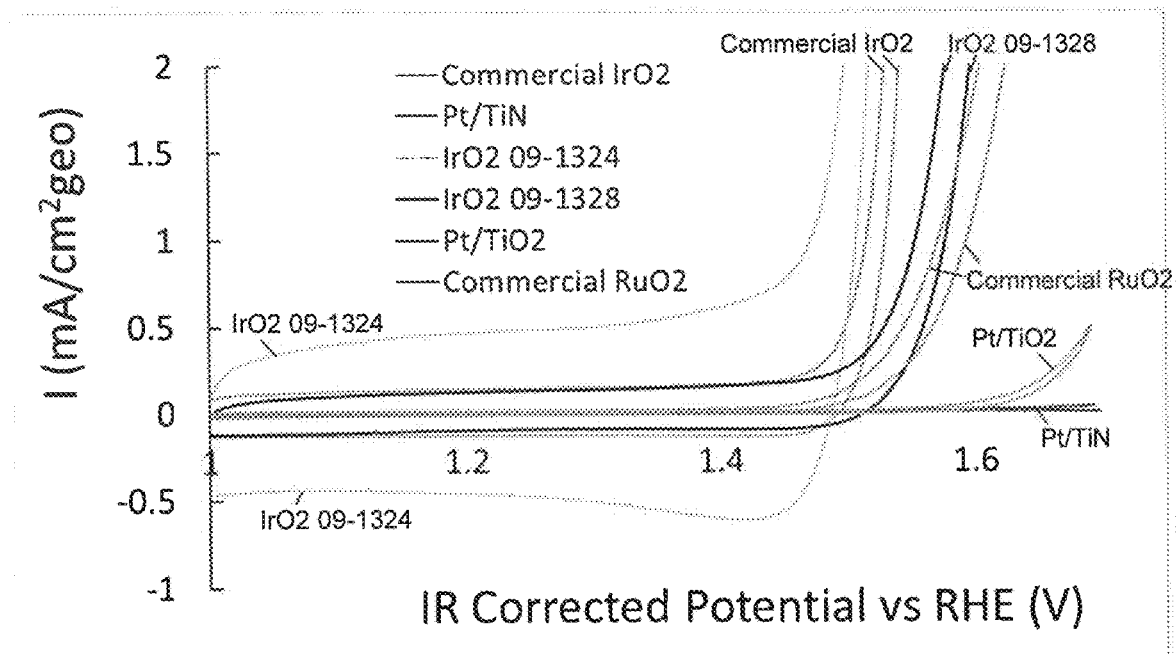
FIG. 8 shows raw voltammograms for high surface area OER catalysts. $IrO_2$ 09-1324 and 09-1328 are experimental unsupported $IrO_2$ powders. Conditions: 1.0-1.7V, 10 mV/s, 1600 rpm, 0.1M $HClO_4$.
Figure 9:
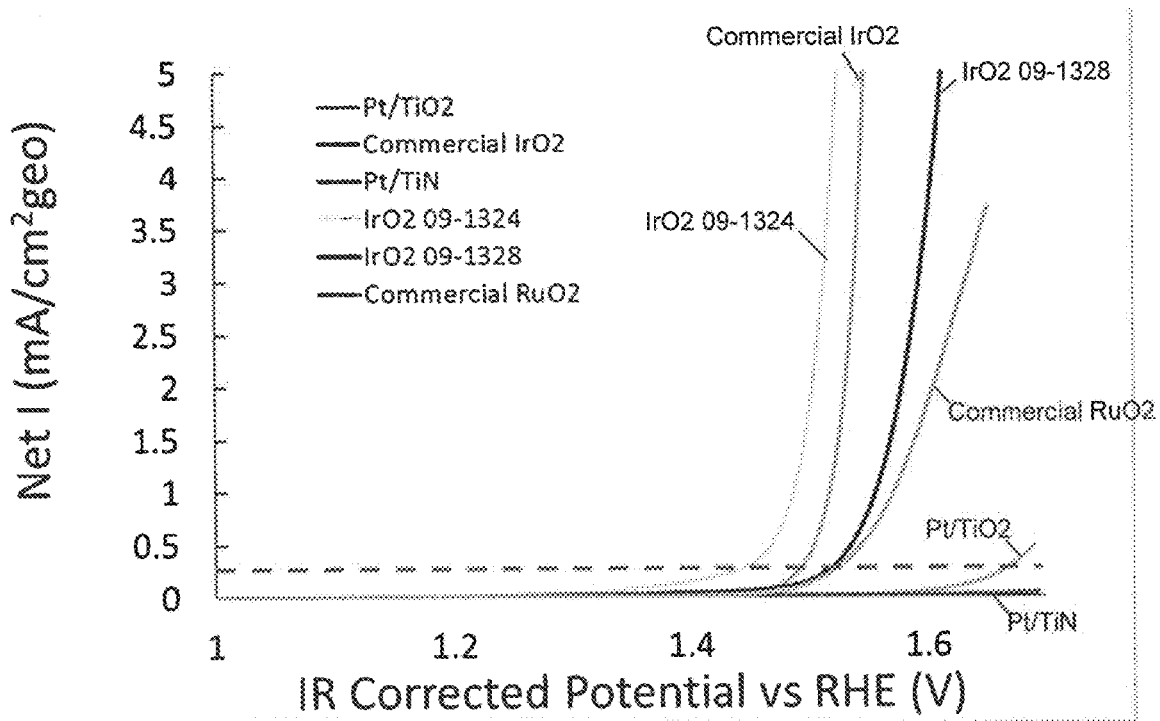
FIG. 9 shows graphs of double layer charging current-corrected voltammograms for high surface area OER catalysts. $IrO_2$ 09-1324 and $IrO_2$ 09-1328 are experimental unsupported $IrO_2$ powders. Conditions: 1.0-1.7V, 10 mV/s, 1600 rpm, 0.1M $HClO_4$.
Figure 10:
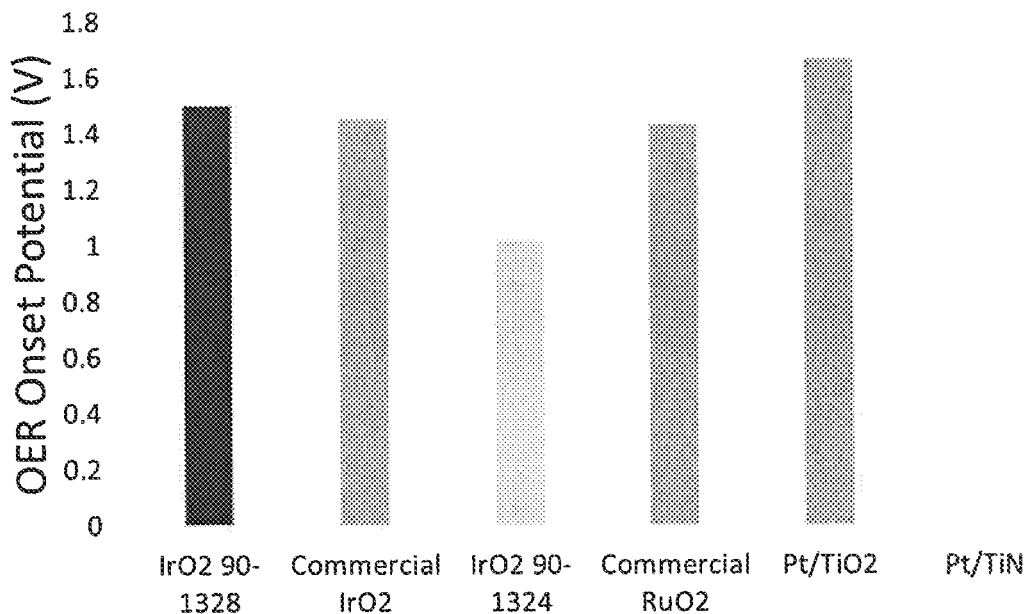
FIG. 10 shows a comparison of OER onset potentials, defined as potential at which the OER current density reaches 0.25 mA/$cm^2_{geo}$, for the various powder catalysts. $IrO_2$ 90-1324 and $IrO_2$ 90-1328 are experimental unsupported $IrO_2$ powders.

The OER activities of unsupported commercial IrO$_2$, RuO$_2$, and two experimental unsupported IrO$_2$ catalysts were benchmarked. The OER activity of the ALD-deposited Pt/TiO$_2$ and Pt/TiN catalysts were also determined as baselines for mixtures of Pt and IrO$_2$ on these supports for the reversible fuel cell application, described further below. The OER activities were screened using RDE with a loading of 100 µg metal/cm$^2$ on the glassy carbon electrode. Voltammograms were recorded from 1.0 to 1.7V in deaerated 0.1M HClO$_4$ while rotating the electrode at 1600 rpm. The raw voltammograms, with the current attributable to a combination of double layer charging and OER, are shown in FIG. 8. The voltammograms with the double layer charging current subtracted are shown in FIG. 9. The double layer charging current is an indicator of surface area of the catalysts, with large double charging capacitance indicating higher surface area. The lab-synthesized unsupported IrO$_2$ shows the highest surface area and the ALD-prepared Pt/TiO$_2$ and Pt/TiN much lower surface area. The catalysts' relative OER activities were assessed using the potential at which the OER current reaches 0.25 mA/cm$^2_{geo}$, shown in FIG. 10. These data show that the lab-prepared IrO$_2$ is the most active catalyst for OER having the lowest OER onset potential. As expected the Pt-based catalysts, Pt/TiO$_2$ and Pt/TiN show very low or non-existent activity for the OER within the potential range studied.

Figure 11:
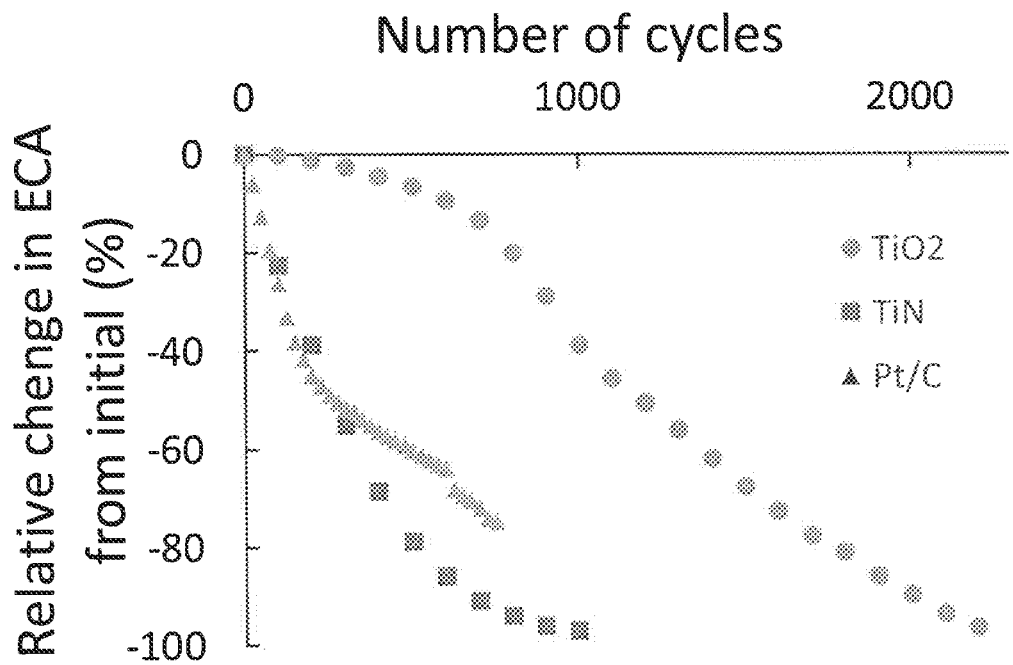
FIG. 11 shows a comparison of ECA loss for the Pt/$TiO_2$ and Pt/TiN during potential cycling from 1.0 to 1.7V at 50 mV/s (900 rpm, deaerated 0.1M $HClO_4$). ECA decay for Pt/HSC is included for comparison.
Figure 12A:
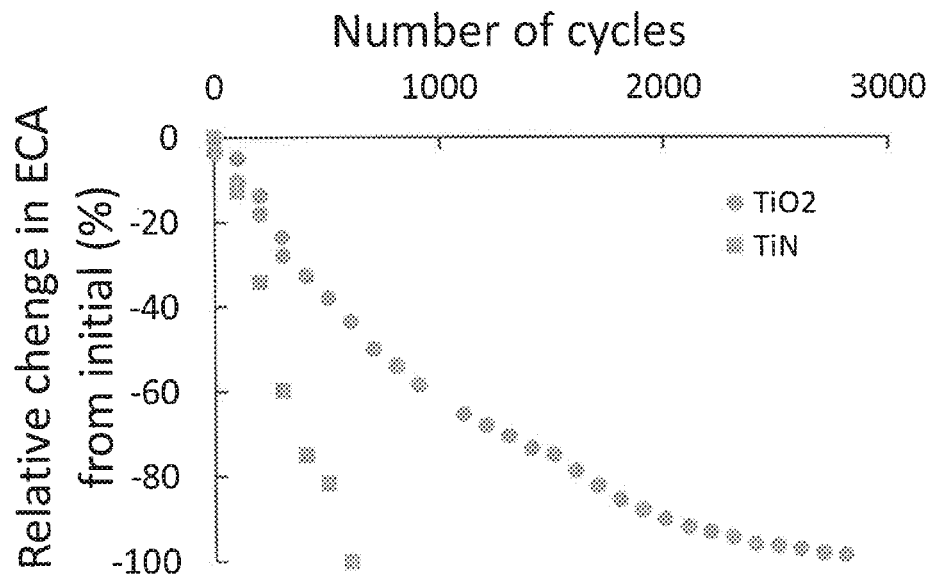
FIGS. 12A and 12B show a comparison of ECA loss for the Pt/$TiO_2$ and Pt/TiN catalysts during potential cycling from 0.6 to 1.7V (FIG. 12A) and 0.6 to 1.0V (FIG. 12 B) (50 mV/s, 900 rpm, deaerated 0.1M $HClO_4$).
Figure 12B:
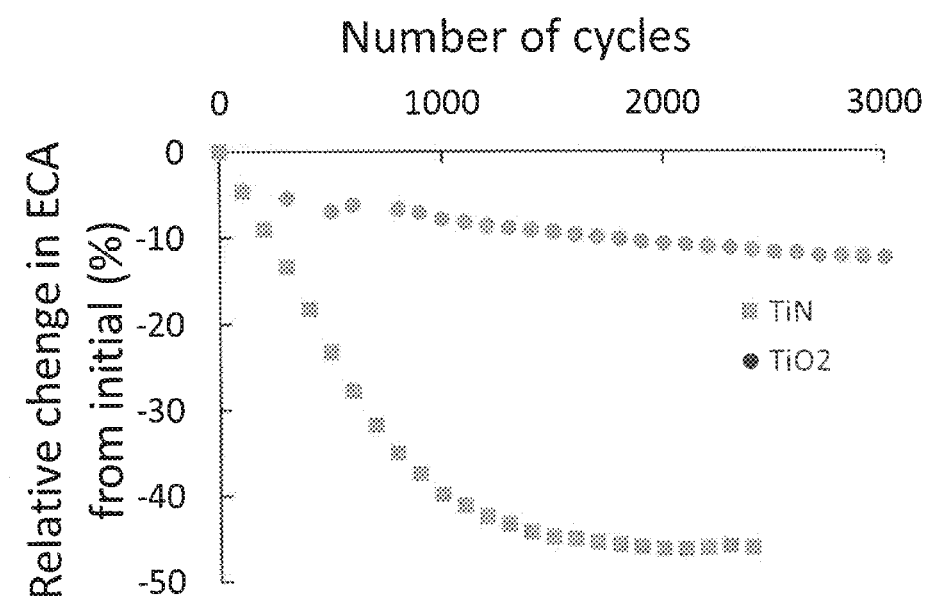

The stability of the ECA of the Pt/TiO$_2$ and Pt/TiN catalysts over potential ranges relevant to the electrolyzer anode, URFC anode, and fuel cell cathode applications was determined by subjecting the catalysts to potential cycles between 1.0 and 1.7V, 0.6 to 1.7V, and 0.6 to 1.0V, respectively. The ECA was determined using the charge for stripping of underpotentially-deposited hydrogen. The relative losses in ECA for Pt/TiO$_2$ and Pt/TiN for the three cycling protocols are shown in FIGS. 11 and 12A-12B. The ECA loss for commercial 46 wt % Pt/HSC from Tanaka when subjected to the 1.0 to 1.7V cycling protocol is also shown in FIG. 11, for comparison. When cycled between 1.0V and 1.7V (OER potentials) Pt/TiO$_2$ shows better ECA stability than either Pt/TiN or Pt/C. This same relative ECA decay rate for the two materials holds for the cycling protocols of 0.6 to 1.7V and 0.6 to 1.0V as well (FIGS. 12A and 12B, respectively). These data show that the relative loss rates for the different cycling protocols increase in the order 0.6-1.0V<1.0-1.7V<0.6-1.7V. While these data show substantial loss rates even when just cycling in the OER potential range (1.0 to 1.7V) and even more substantial loss when transitioning to lower potentials, which would be the case for the URFC anode, previous studies have shown that mixtures of Pt and $IrO_2$ are more stable that either Pt or $IrO_2$ alone.

ALD Deposited Powders Using Ozone

In addition to ALD Pt, ALD Ir and ALD Pt—Ir alloy catalysts can be synthesized using the methods of our invention. The ALD Ir and ALD Pt—Ir alloy catalysts can exhibit superior catalytic performance compared to the ALD Pt. The following details the steps used to prepare the ALD Ir and ALD Pt—Ir alloy catalysts, but it will be obvious to one skilled in the art that these methods may be applied to prepare a wide range of mixed-metal and mixed-metal oxide ALD catalysts.

Experiments were performed using $O_3$ and the metal precursors $PtMe_3CpMe$ and/or $Ir(acac)_3$ in an ALD process to deposit the respective metal on a substrate. The substrates for the experiments were TiC, TiN, $TiO_2$ (5 nm) and $TiO_2$ (40 nm). Three sample catalysts were prepared as follows:

Pt: $PtMe_3CpMe$ (63° C.)+$O_3$, 3/10/3/10, 65 cycles (assuming literature density, growth rate from quartz crystal microbalance (QCM) measurements is 0.49 A $cycle^{-1}$)

Ir: $Ir(acac)_3$ (187° C.)+$O_3$, 15/10/3/18, 80 cycles (assuming literature density, growth rate from QCM is 0.46 A $cycle^{-1}$)

Ir—Pt: 15/10/3/18+3/10/3/10, 60 cycles

Below is shown a table of XPS analysis taken from representative reference samples deposited on a silicon plate. All reference samples prepared during nanopowder coatings showed similar amounts of the screened elements.

|   |   | Ir (at. %) | Pt (at. %) | C (at. %) | O (at. %) | Si (at. %) (native oxide) |
|---|---|---|---|---|---|---|
| Pt | Surface | n.d. | 27.44 | 21.33 | 20.23 | 31.00 |
|    | After sputtering | n.d. | 32.13 | 1.75 | 16.64 | 49.49 |
| Ir | Surface | 29.68 | n.d. | 10.47 | 45.99 | 13.86 |
|    | After sputtering | 36.04 | n.d. | n.d. | 30.5 | 33.48 |
| Ir—Pt | Surface | 25.17 | 25.84 | 14.27 | 34.71 | n.d. |
|    | After sputtering | 44.31 | 50.37 | 0.0 | 5.32 | n.d. |

Figure 13A:
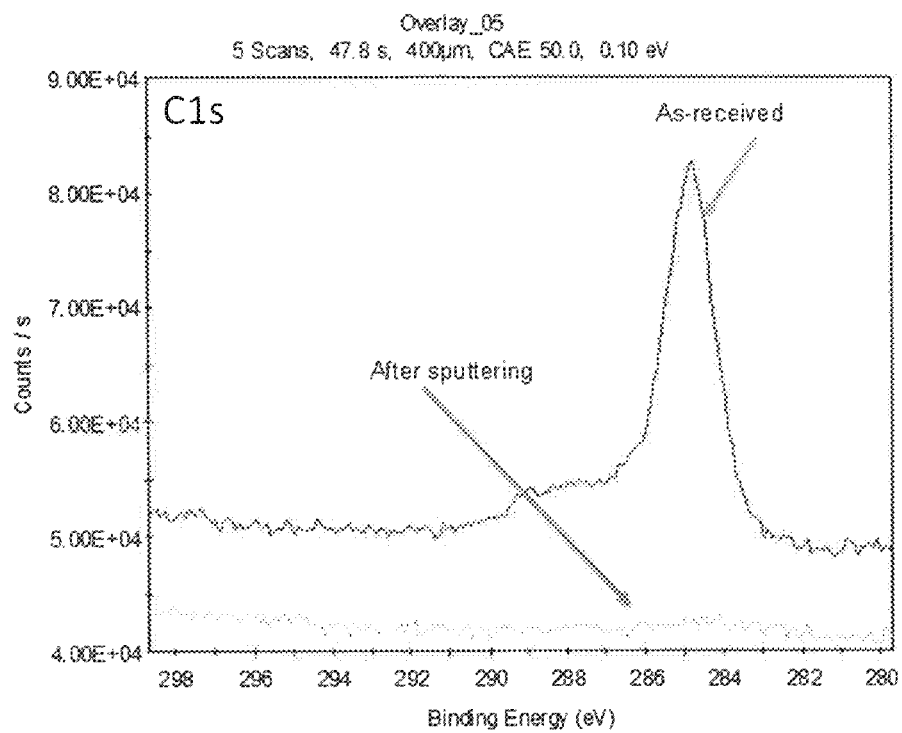
FIGS. 13A-13D show counts per second as a function of binding energy (eV recorded from XPS measurements using a Thermo-Fisher k-alpha spectrometer).
Figure 13B:
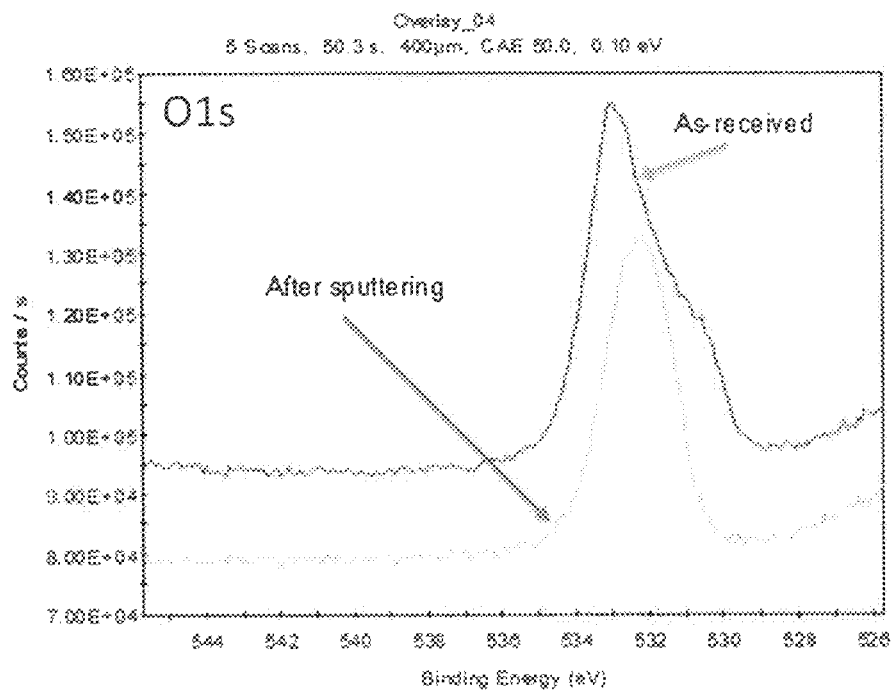
Figure 13C:
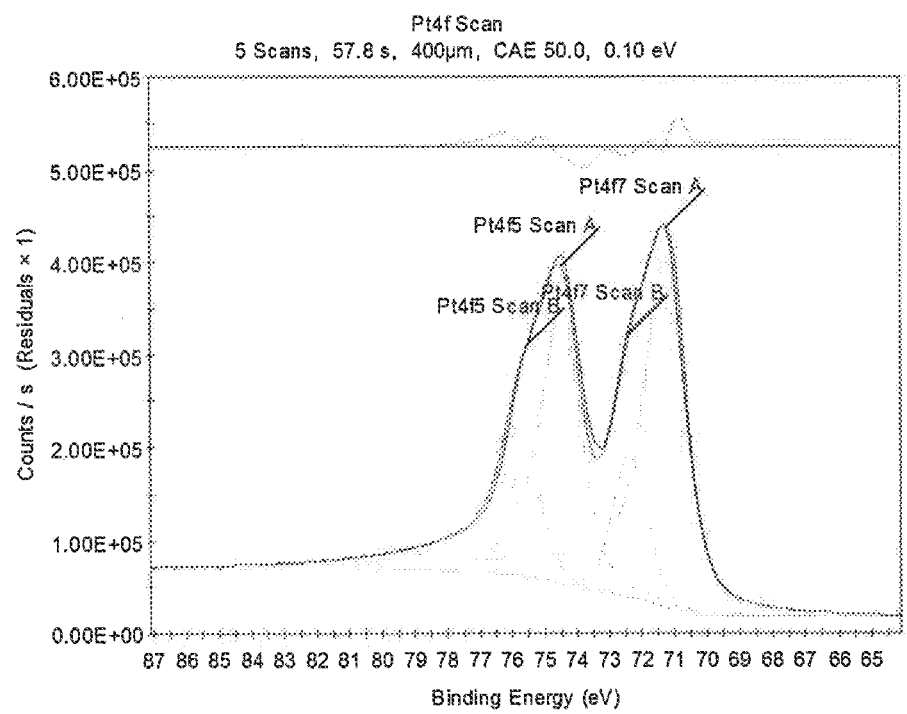
Figure 13D:
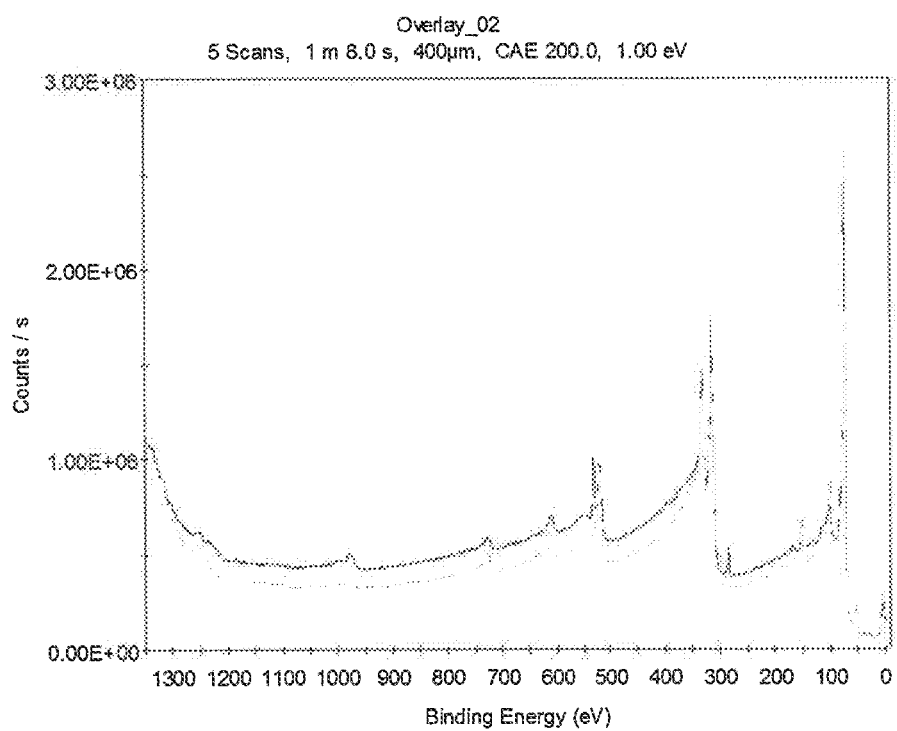

The Pt samples were fabricated using the ALD recipe noted above. FIGS. 13A-13D show counts per second as a function of binding energy (eV recorded from XPS measurements using a Thermo-Fisher k-alpha spectrometer). FIG. 13B shows some oxygen contamination in the film, likely $PtO_2$ (15.0%:7%=2.1).

The table below includes XPS data for the Pt sample.

|   |   | Pt (at. %) | C (at. %) | O (at. %) | Si (at. %) (native oxide) |
|---|---|---|---|---|---|
| Pt | Surface | 27.44 | 21.33 | 20.23 | 31.00 |
|    | After sputtering | 32.13 (78.1% are metallic, 21.9% are oxidized) → 7% of Pt are oxidized | 1.75 | 16.64 (8.3% are $SiO_2$, 91.7% are Pt—O) → O1s Pt—O: 15.0% → O1s Si—O: 1.6% | 49.49 |

Figure 14A:
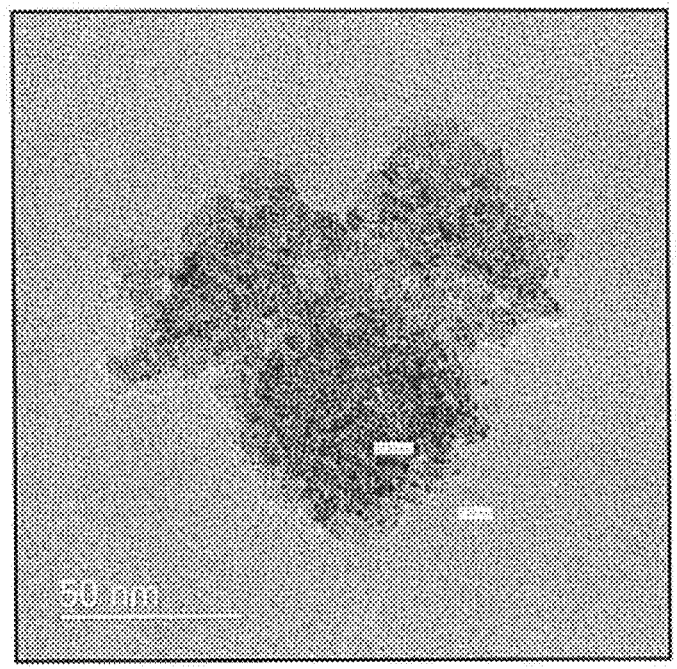
FIGS. 14A and 14B show the silicon reference sample for $TiO_2$ (5 nm) nanopowder for comparison purposes to the experimental thin film material. As can be seen in the figures, the powder supports agglomerated.
Figure 14B:
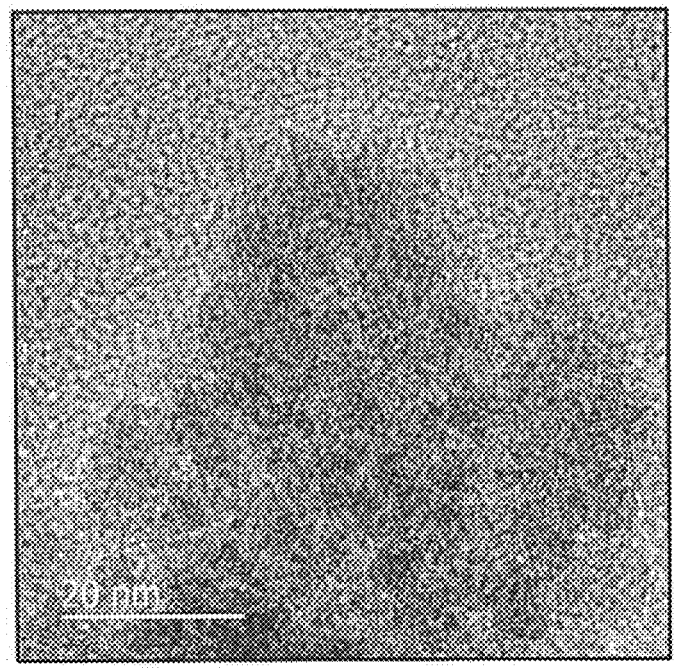

FIGS. 14A and 14B show the silicon reference sample for $TiO_2$ (5 nm) nanopowder for comparison purposes to the experimental thin film material. As can be seen in the figures, the powder supports agglomerated. The Pt is of about 7 nm thickness, island growth is not likely due to agglomeration.

Figure 15A:
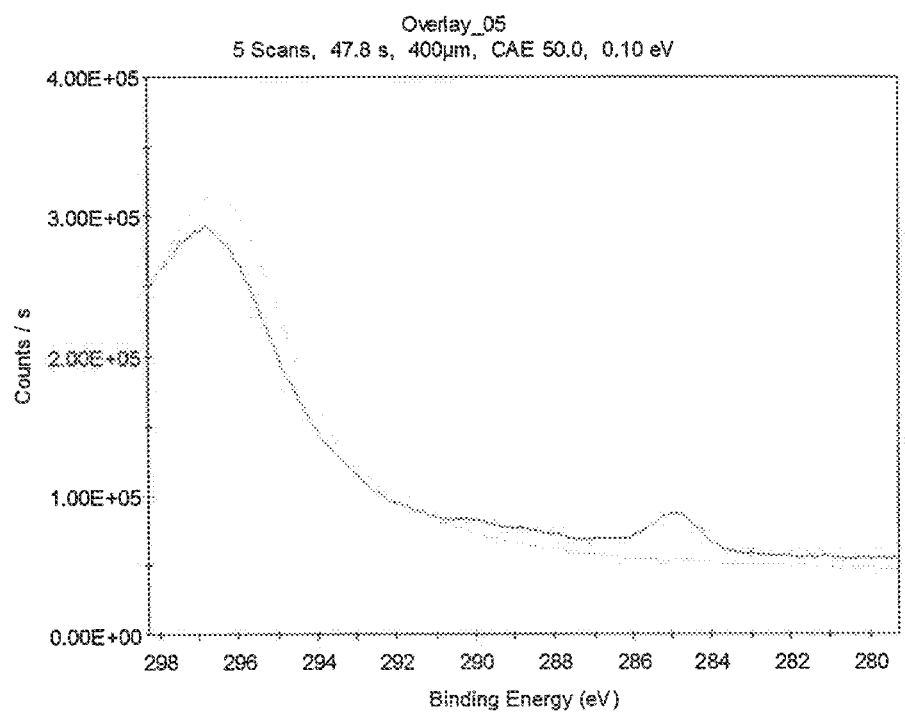
FIGS. 15A-15C show counts per second as a function of binding energy (eV) for Ir.
Figure 15B:
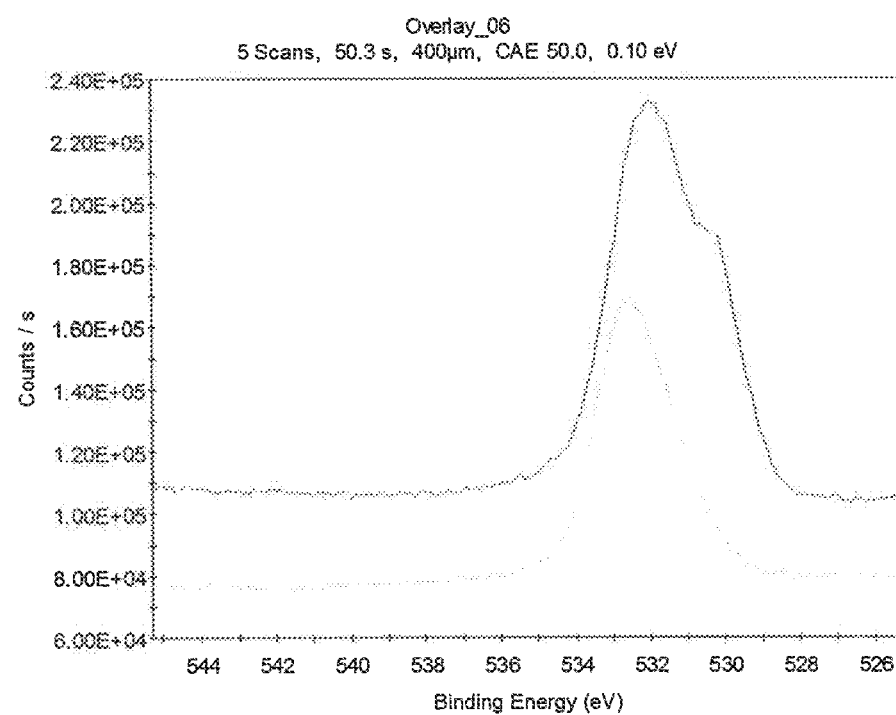
Figure 15C:
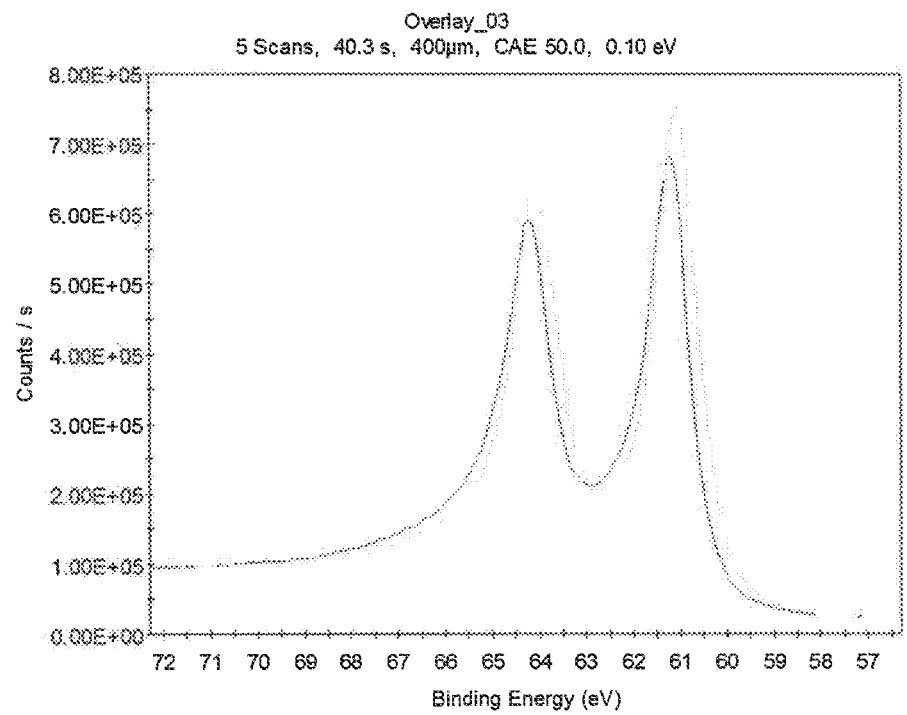

Another sample was created using the recipe noted above to form Ir thin film on a substrate by ALD. FIGS. 15A-15C shows show counts per second as a function of binding energy (eV) for Ir.

|   |   | Ir (at. %) | C (at. %) | O (at. %) | Si (at. %) (native oxide) |
|---|---|---|---|---|---|
| Ir | Surface | 29.68 | 10.47 | 45.99 | 13.86 |
|    | After sputtering | 36.04 (69.0% are metallic, 31.0% are oxidized) → 11.2% of Ir are oxidized | 0 | 30.5 (13.04% are $SiO_2$, 86.96% are Ir—O) → O1s Ir—O: 26.5% → O1s Si—O: 4.0% | 33.48 |

Some oxygen contamination in the film, likely $IrO_2$ (11.2%: 26.5%=2.4).

Figure 16A:
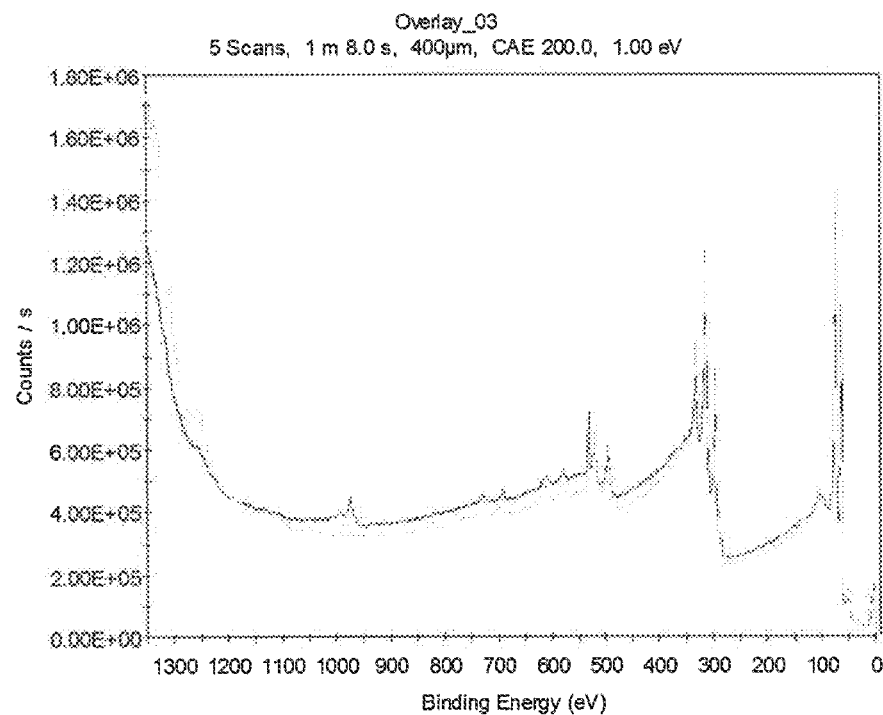
FIGS. 16A-16C show counts per second as a function of binding energy (eV) of Ir—Pt.
Figure 16B:
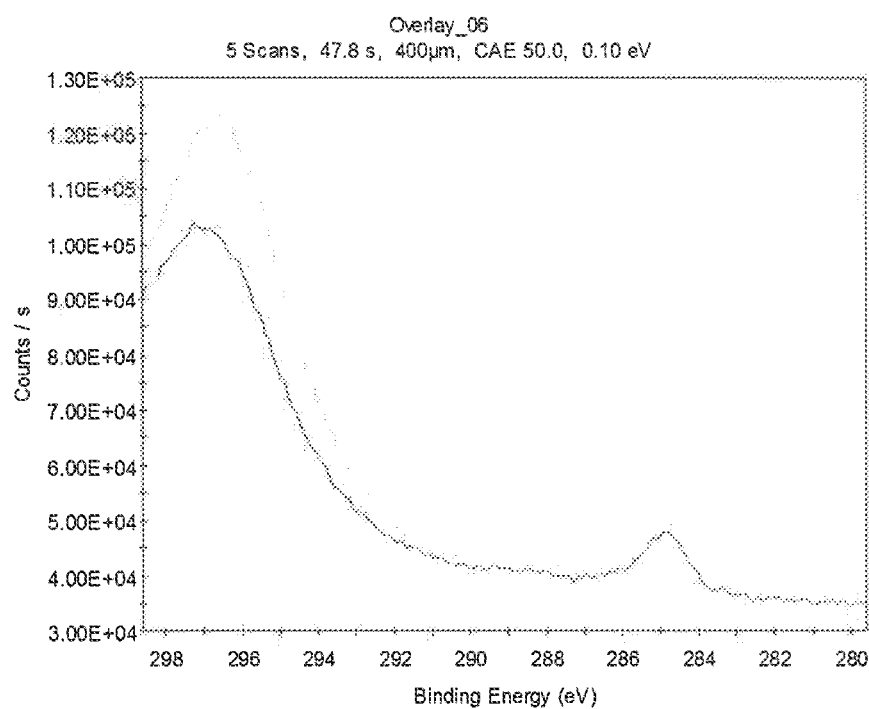
Figure 16C:
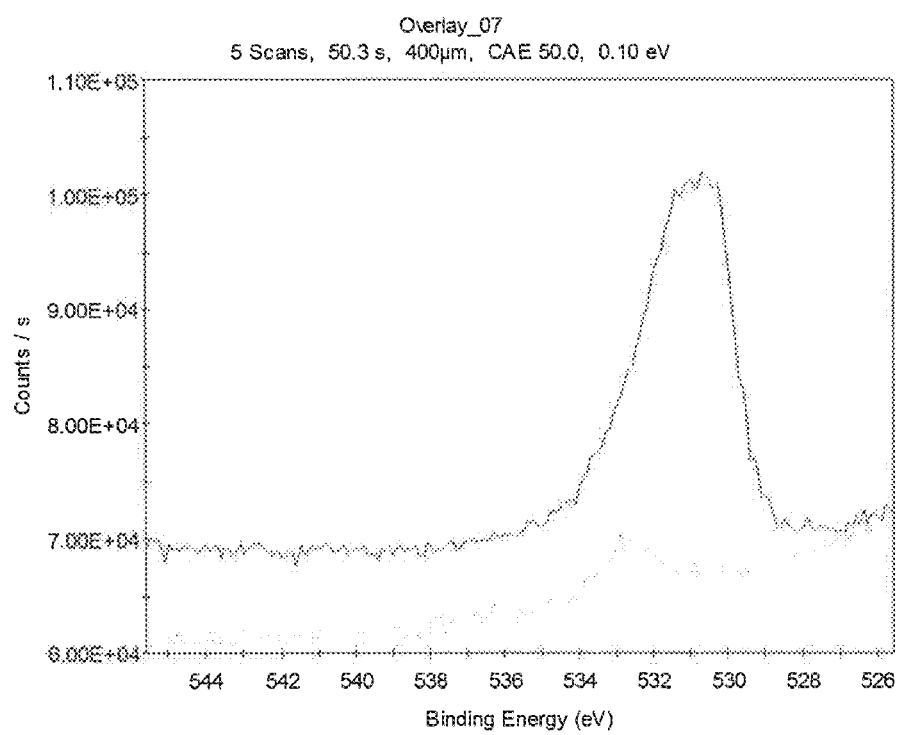

A third sample was prepared by the recipe noted above to create Ir—Pt material. FIGS. 18A-16C show counts per second as a function of binding energy (eV) of Ir—Pt. The Ir—Pt process shows less oxygen contamination than pure metals. The binding energy of the $O_1s$ signals suggests O is mainly from Si—O. Further, the low amount of Si detected via XPS indicate the Ir—Pt thin film completely coats the substrate, forming a closed layer. This is the desired structure of the film since it maximizes the surface area of catalytically-active metal/oxide for a given volume of the support material.

Definitions

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed:

1. A catalyst material comprising:
a support comprising $M_1M_2C_yN_zO_w$, nanoparticles where $M_1$ and $M_2$ are transition metals, $M_1$ comprises one of Ti, Ta, or Zr and further where more than one of y, z, and w are greater than 0, the nanoparticles not containing carbon in an elemental form, wherein the support has an effective diameter of 40 nm to 60 nm; and
a thin film covalently bonded to the support, the thin film having a thickness of 0.5 nm to 5.0 nm, the thin film comprising a catalytic metal selected from the group consisting of platinum-group metals, platinum-group metal oxides, transition metals, transition metal oxides, and combinations thereof.

2. The catalyst of claim 1, wherein the thin film encapsulates the support.

3. The catalyst of claim 1, comprising a plurality of thin films deposited on the support as patches having a diameter of greater than 10 nm.

4. The catalyst material of claim 1, included in a proton-exchange membrane fuel cell (PEMFC).

5. The catalyst material of claim 1, including in a unitized reversible or regenerative fuel cell (URFC).

6. The catalyst material of claim 1, wherein the catalytic metal comprises a Pt—Ir alloy.

7. A fuel cell comprising:
a catalytic material comprising:
a support comprising $M_1M_2C_yN_zO_w$, where $M_1$ and $M_2$ are transition metals, $M_1$ comprises one of Ti, Ta, or Zr and further where one of y, z, and w are greater than 0, the support free of elemental carbon; and
a thin film covalently bonded to the support, the thin film having a thickness of 0.5 to 5.0 nm, the thin film comprising a catalytic metal selected from the group consisting of platinum-group metals, platinum-group metal oxides, transition metals, transition metal oxides, and combinations thereof;
wherein the thin film interacts with the support through Strong Metal Support Interactions.

8. The fuel cell of claim 7, wherein the support has an effective diameter of 10 nm to 500 nm.

9. The fuel cell of claim 7, wherein the thin film encapsulates the support.

10. The fuel cell of claim 7, comprising a plurality of thin films deposited on the support as patches.

11. The fuel cell material of claim 7, included in a proton-exchange membrane fuel cell (PEMFC).

12. The fuel cell material of claim 7, including in a unitized reversible or regenerative fuel cell (URFC).

* * * * *